(12) United States Patent
Deforge et al.

(10) Patent No.: US 12,348,250 B2
(45) Date of Patent: *Jul. 1, 2025

(54) SIGNAL INJECTION AT RADIO TAP POINTS IN A TIME DOMAIN

(71) Applicant: Dell Products L.P., Round Rock, TX (US)

(72) Inventors: John Bradley Deforge, Chelsea (CA); Tommy Ivarsson, Ottawa (CA); Sewvanda Don, Ottawa (CA)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/620,526

(22) Filed: Mar. 28, 2024

(65) Prior Publication Data

US 2024/0243766 A1 Jul. 18, 2024

Related U.S. Application Data

(63) Continuation of application No. 17/659,757, filed on Apr. 19, 2022, now Pat. No. 11,967,979.

(51) Int. Cl.
 *H04B 1/04* (2006.01)
 *H04B 7/26* (2006.01)
(52) U.S. Cl.
 CPC ............. *H04B 1/04* (2013.01); *H04B 7/2662* (2013.01)
(58) Field of Classification Search
 CPC ... H04B 1/04; H04B 1/10; H04B 1/12; H04B 1/44; H04B 7/2662; H04B 17/00; H04B 17/11; H04B 17/21; H04B 17/0085; H04L 5/00; H04L 12/28; H04W 56/00; H04W 72/04; H04W 88/02
 USPC .................................. 375/219, 295–297, 316
 See application file for complete search history.

(56) References Cited

U.S. PATENT DOCUMENTS

| | | | |
|---|---|---|---|
| 7,362,800 B1 | 4/2008 | Zerbe et al. | |
| 11,967,979 B2* | 4/2024 | Deforge | H04B 17/221 |
| 2016/0080018 A1 | 3/2016 | Sankaranarayanan et al. | |
| 2022/0209805 A1 | 6/2022 | Yu et al. | |
| 2022/0271782 A1 | 8/2022 | Arditti Ilitzky et al. | |

OTHER PUBLICATIONS

International Search Report and Written Opinion for PCT Application No. PCT/US2022/053277 mailed Apr. 28, 2023, 15 pages.
Office Action mailed Oct. 5, 2023 for U.S. Appl. No. 17/659,757, 28 pages.
Notice of Allowance mailed Dec. 20, 2023 for U.S. Appl. No. 17/659,757, 35 pages.

(Continued)

*Primary Examiner* — Shawkat M Ali
(74) *Attorney, Agent, or Firm* — Amin, Turocy & Watson, LLP

(57) ABSTRACT

A system can comprise a radio unit comprising a digital front end, wherein the digital front end comprises a group of tap points that are configured to receive a first custom signal. The system can also comprise a first component that is configured to originate the first custom signal. The system can also comprise a second component that is configured to select a first tap point of the group of tap points, and inject the first custom signal into the first tap point.

20 Claims, 19 Drawing Sheets

(56) References Cited

OTHER PUBLICATIONS

Notification Concerning Transmittal of International Preliminary Report on Patentability mailed Oct. 31, 2024 for PCT Application No. PCT/US2022/053277, 10 pages.
European Office Action mailed Nov. 26, 2024 for European Patent Application No. 22854426.8, 3 pages.

* cited by examiner

900

```
┌─────────────────────────────────────────────────────┐
│  ┌───────────────────────────────────────────────┐  │
│  │  FIRST COMPONENT THAT IS CONFIGURED TO         │  │
│  │  ORIGINATE A FIRST CUSTOM SIGNAL 902           │  │
│  └───────────────────────────────────────────────┘  │
│                                                     │
│  ┌───────────────────────────────────────────────┐  │
│  │  SECOND COMPONENT THAT IS CONFIGURED TO        │  │
│  │  SELECT A FIRST TAP POINT OF A GROUP OF TAP    │  │
│  │  POINTS OF A DIGIDAL FONT END OF A RADIO       │  │
│  │  UNIT 904                                      │  │
│  └───────────────────────────────────────────────┘  │
│                                                     │
│  ┌───────────────────────────────────────────────┐  │
│  │  THIRD COMPONENT THAT IS CONFIGURED TO         │  │
│  │  INJECT THE FIRST CUSTOM SIGNAL INTO THE       │  │
│  │  FIRST TAP POINT 906                           │  │
│  └───────────────────────────────────────────────┘  │
└─────────────────────────────────────────────────────┘
```

```
┌─────────────────────────────────────────────────────────┐
│  ┌───────────────────────────────────────────────────┐  │
│  │  FIRST COMPONENT THAT IS CONFIGURED TO ORIGINATE A │  │
│  │            FIRST CUSTOM SIGNAL 1202                │  │
│  └───────────────────────────────────────────────────┘  │
│                                                         │
│  ┌───────────────────────────────────────────────────┐  │
│  │  SECOND COMPONENT THAT IS CONFIGURED TO SELECT A   │  │
│  │   FIRST TAP POINT OF A GROUP OF TAP POINTS OF A    │  │
│  │     DIGIDAL FONT END OF A RADIO UNIT 1204          │  │
│  └───────────────────────────────────────────────────┘  │
│                                                         │
│  ┌───────────────────────────────────────────────────┐  │
│  │  THIRD COMPONENT THAT IS CONFIGURED TO INJECT THE  │  │
│  │   FIRST CUSTOM SIGNAL INTO THE FIRST TAP POINT 1206│  │
│  └───────────────────────────────────────────────────┘  │
│                                                         │
│  ┌───────────────────────────────────────────────────┐  │
│  │  FOURTH COMPONENT THAT IS CONFIGURED TO ADJUST A   │  │
│  │   GAIN OF THE FIRST CUSTOM SIGNAL BEFORE THE       │  │
│  │  SECOND COMPONENT INJECTS THE FIRST CUSTOM         │  │
│  │      SIGNAL INTO THE FIRST TAP POINT 1218          │  │
│  └───────────────────────────────────────────────────┘  │
└─────────────────────────────────────────────────────────┘
```

FIG. 12

SIGNAL INJECTION AT RADIO TAP POINTS IN A TIME DOMAIN

RELATED APPLICATION

The subject patent application is a continuation of, and claims priority to, U.S. patent application Ser. No. 17/659,757, filed Apr. 19, 2022, and entitled "SIGNAL INJECTION AT RADIO TAP POINTS IN A TIME DOMAIN," the entirety of which priority application is hereby incorporated by reference herein.

BACKGROUND

A radio can comprise a receiver and a transmitter that are used to receive and transmit, respectively, data.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can comprise a radio unit comprising a digital front end, wherein the digital front end comprises a group of tap points that are configured to receive a first custom signal. The system can also comprise a first component that is configured to originate the first custom signal. The system can also comprise a second component that is configured to select a first tap point of the group of tap points, and inject the first custom signal into the first tap point.

An example method can comprise identifying, by a system comprising a processor, a group of tap points in a digital front end of a radio unit, wherein the group of tap points are configured to receive a first custom signal. The method can further comprise originating, by the system, the first custom signal. The method can further comprise selecting, by the system, a first tap point from the group of tap points. The method can further comprise injecting, by the system, the first custom signal into the first tap point.

An example apparatus can comprise a first component that is configured to originate a first custom signal. The apparatus can further comprise a second component that is configured to select a first tap point of a group of tap points of a digital front end of a radio unit. The apparatus can further comprise a third component that is configured to inject the first custom signal into the first tap point.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 9 illustrates another example system architecture that can facilitate signal injection at radio tap points in a time domain, in accordance with an embodiment of this disclosure;

FIG. 12 illustrates another example system architecture that can facilitate signal injection at radio tap points in a time domain, in accordance with an embodiment of this disclosure.

DETAILED DESCRIPTION

Overview

Figure 1:
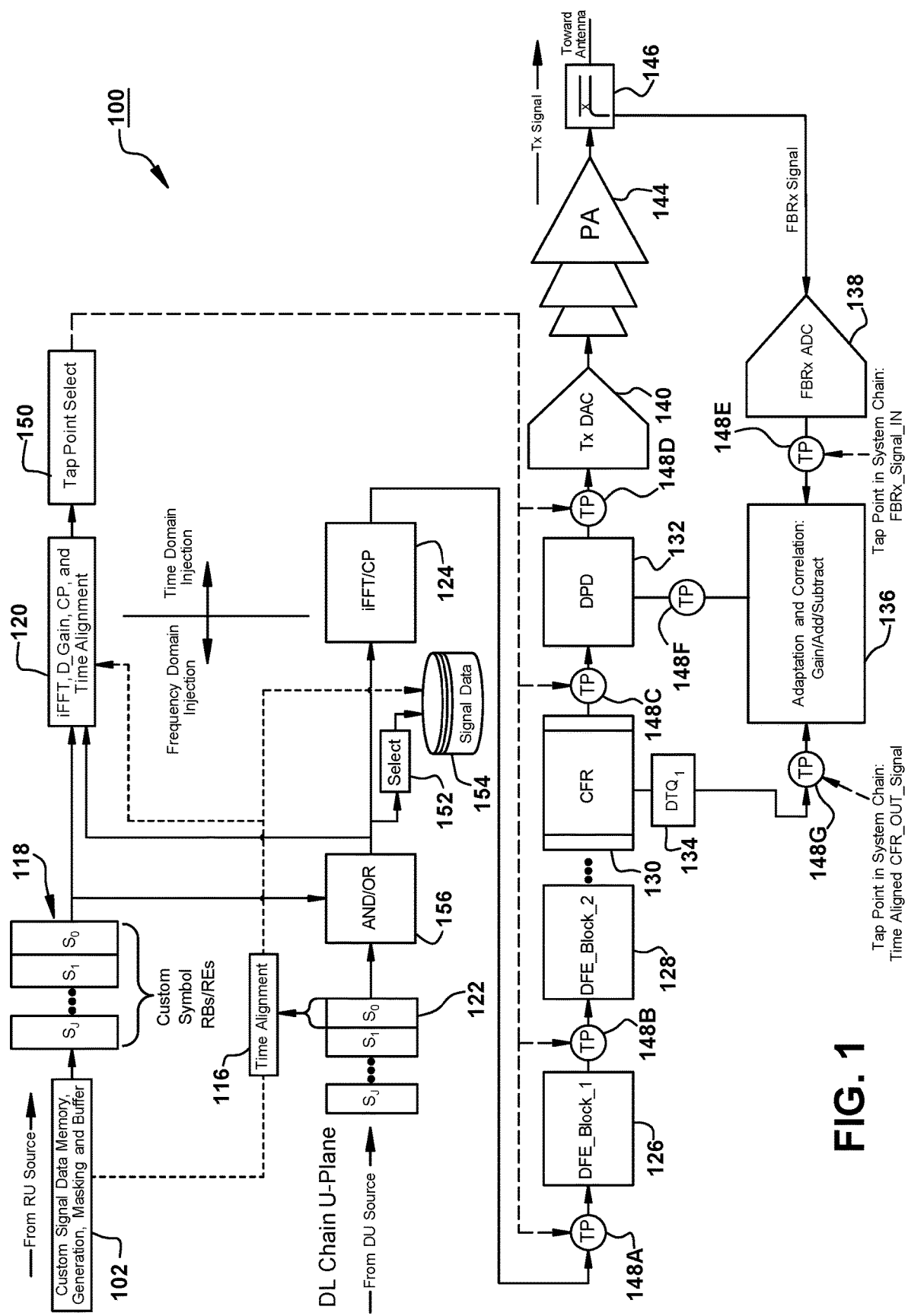
FIG. 1 illustrates an example system architecture for injecting a signal into a radio down link chain, and that can facilitate signal injection at radio tap points in a time domain, in accordance with an embodiment of this disclosure.

In modern wireless communications deployments, aspects and impacts of radio development engineering and system design tradeoffs can have far-reaching implications into customer capital expenditures, operating expenditures and overall completeness of a vendor's radio offerings. These engineering and systems design tradeoffs can result in what can be generally characterized as overall radio size, weight, thermal dissipation, reliability, complexity, and cost.

Prior approaches to radios can omit custom tap points. A reason for this can be that an engineering organization has created a radio system architecture over years, and adding custom tap points would require a significant overhaul of this radio system architecture. That is, where there is an installed base on software and operational control approaches features exists, and this installed base does not include a level of access via tap points, then a change to introduce tap points can disrupt this installed base of products.

Another reason can be that, prior approaches to radios can involve a radio developer selling a radio system to an expert customer, such as a Tier 1 carrier that has its own engineering team that is capable of performing certain radio system functions (e.g., those that support long-term management and maintenance of a radio system via a view into midpoints of the system) without the use of custom tap points. In an example where there is not a legacy radio system architecture to be built upon, and where an entity that uses the radio system has less expertise with radio systems than a Tier 1 carrier (e.g., a non-carrier business, or a person), custom tap points can be implemented to solve a problem of analyzing radio system performance by facilitating injecting and reading signals at specific points within a radio system.

As described herein, a signal injected into a custom tap point of a radio system can be time aligned with the radio system, and masking can be applied to the injected signal to selectively inject the signal into the radio system.

An ability to generate customized signal data and inject into a radio's signal chain can be tantamount to an ability to further capture and derive key performance data from radio sub-systems. According to the present techniques, and analogous to custom waveforms from a signal generator, a custom signal can be injected or added to live-air traffic signals (which can sometimes be referred to as mission mode signals) to become a custom hybrid of live-air traffic signal data. Custom signals, or signals independent of live-air traffic signals (that is, non-live-air traffic signals, which can sometimes be referred to as non-mission mode signals) can also be generated. Custom signal data can, in many instances, be statistically equivalent to live-air traffic data. In some examples according to the present techniques, live-air traffic data can be used as if it were custom data.

An ability to read, record and recall data for further analysis can facilitate a deeper understanding of system performance (among other things), and can be further used to determine improved performance aspects of system operation, maintenance, and customer experience (among other things).

The present techniques can be implemented to create and inject custom waveforms into custom tap points in a digital front end of a radio unit. In some examples, custom tap points are not part of a standard digital front end data path, and are added to support this injection.

In some examples, creation and injection of custom waveforms can happen in a down link path of a radio unit. In some examples, creation and injection of custom waveforms can happen in an up link path of a radio unit. Signal injection can be derived from a radio unit-based source in a time domain.

Coverage for all antenna branches of a radio can be provided. Data can be introduced to each antenna branch, and can be the same data for each branch, or different data for different branches. Data can be introduced to a down link signal path and/or an up link signal path.

In some examples, data can be injected at any tap point along a system's signal chain in a down link, feedback, or up link path. Data can pass through one or multiple digital front end blocks. Data can pass to an analog portion of a radio's signal chain. Multiple injection paths can exist where a multiplicity of signal data can be introduced at different tap points, which can include different antenna branches, simultaneously.

Custom data (which can sometimes be referred to as a value, or a signal or a waveform when viewed over a time period) according to the present techniques can be originated in several ways, including the following. A memory that is onboard to the radio can be configured to temporally play a suitable waveform or noise-like signal. A dynamic resource block (RB)/resource element (RE) allocation can be configured to, in some examples generate between 1 and 4,096 (or other) inphase and quadrature (I+Q, or I/Q) 16 bit (signed) data pairs of arbitrary sub-carrier values for a given desired modulation coding scheme (MCS). Such a dynamic RB/RE allocation can be operated as a Moore machine or a Mealy machine.

In some examples, with regard to originating custom data and to analyzing a radio via hardware acceleration, knowing the source signal (e.g., data) in advance can be used to determine performance based on the injected signal. That is, there can be a case where input data is not captured in the system, but is known to the system. In such a case, a derivation of performance based on the pre-selected captured data can be compared in memory to the original data (rather than captured data), where the original data is determined based on a memory comparison rather than a capture. This approach can save computing resources relative to capturing the input data.

A look up table can be configured to store predetermined I/Q data values, which are each able to represent a component of a constellation of a given MCS level. Look up table data can be played in order, or randomized to be playable in any order. In some examples, a look up table can fulfill a given constellation/MCS symbol map and a predetermined complementary cumulative distribution function (CCDF). A signal from a look up table can be a one-tone signal or a multi-tone signal.

A pseudo-random look up table generator can operate in conjunction with a look up table. A pseudo-random look up table generator can comprise a block that operates on the look up table's I/Q data and produces a pseudo random symbol of data values of suitable random distribution. Values can be selected from the look up table in a random fashion to fulfill a symbol (e.g., a complete RB matrix) of signal data).

Regarding dimensioning, 1 I+Q data pair can be equivalent to 1 resource element/sub-carrier in a frequency domain. In an example, there can be up to 4,096 resource elements of I+Q, up to 16 bits (signed data pairs). In an example, data generated for a radio unit can support masking so that all, or a subset, of the 0 to 4,095 resource elements available can either be passed to, or removed from, a data stream via an AND/OR block. In some examples, a mask can be enabled or disabled, where a disabled mask is a pass-through state.

MCSes can be available as supported by radio requirements. Data can be triggered and time aligned with system timing on a symbol by symbol basis. In some examples, data can be triggered and time aligned based on other relevant system time boundaries.

In some examples, data AND/OR blocks can be implemented for selecting a source of data. A distributed unit can provision one resource, or a plurality of resources, of signal data available to radio unit sourced signal data for injection of custom data. Data can be sourced purely from a distributed unit live-air traffic u-plane path source (that is, the data can be live-air traffic data). Data can be sourced purely from sources internal to a radio unit, and injected into the u-plane data path (that is, the data can be non-live-air traffic data). These sources can include a memory, a dynamic RB/RE generator, a look up table, and a pseudo-random look up table, with or without a mask enabled. Data can be sourced from a combination of both sources for a distributed unit and radio unit u-plane (That is, the data can be a hybrid of live-air traffic data and non-live-air traffic data).

In some examples, pure live-air traffic signal data, hybrid custom and live-air traffic signal data, and full custom data can be generated on the distributed unit alone. In some examples, a radio unit can pass live-air traffic data unmodified (e.g., pure live-air traffic data), can manufacture a custom hybrid data of custom and live-air traffic data, and can provide full custom data. That is, in examples, data (be it pure, hybrid, or full-custom) can be solely originated by the RU, or solely originated by the DU. And in some examples, a combination of live-traffic data from a distributed unit and hybrid-custom data from a radio unit can be originated.

The present techniques can be implemented to facilitate custom signal generation handling and routing. Optional inverse Fast Fourier Transform can be performed on a custom signal so that the custom signal can be generated in a time domain. Cyclic prefix insertion can be optionally performed, as can gain control.

Time alignment can be performed on a custom signal, and can include full signal pre-conditioning in a time domain and a frequency domain. Hardware acceleration can be implemented for preconditioning in real time based on down stream signal capture and post processing.

Custom signals can be dynamically controlled and used in conjunction with live-air signals. The present techniques can be implemented to control which blocks see injected signals.

Example Architectures

FIG. 1 illustrates an example system architecture 100 for injecting a signal into a radio down link chain, and that can facilitate signal injection at radio tap points in a time domain, in accordance with an embodiment of this disclosure.

System architecture 100 can function as a down link signal path of radio. As depicted, system architecture 100 comprises custom signal data memory, generation, masking, and buffer 102 (which can comprise a combination of some or all of a look up table, a pseudo-random look up table generator, a generator, a memory, an OR gate to combine data sources, masking, and a buffer), time alignment 116, custom symbol resource blocks bands/resource elements (RBs/REs) 118, inverse Fast Fourier Transform (iFFT) 120 (which can also perform Δ gain, time alignment, and optional cyclic prefix (CP) insertion), RB/RE 122, iFFT/CP 124, digital front end (DFE) block 1 126, DFE block 2 128, crest factor reduction (CFR) 130, digital pre-distortion (DPD) 132, delta-time-phase (ΔTΘ) 134, adaptation and correlation 136, feedback receiver analog-to-digital converter 138, transmitter digital to-analog converter 140, power amplifier 144, signal coupler 146, tap point 148A, tap point 148B, tap point 148C, tap point 148D, tap point 148E, tap point 148F, tap point 148G, tap point select 150, select 152, signal data 154, and AND/OR 156.

Custom signal data memory, generation, masking, and buffer 102 can create a custom signal. This custom signal can then be selectively injected at one or more of tap point 148A, tap point 148B, tap point 148C, tap point 148D, tap point 148E, tap point 148F, and tap point 148G by selecting a tap point with tap point select 150.

By selectively injecting a signal at a particular tap point, certain blocks of a down link chain can be avoided by the signal. This can be implemented to, for example, selectively measure the performance of a sub-portion of a radio.

Custom signal data memory, generation, masking, and buffer 102 can be used to originate the signal. Then, masking of custom signal data memory, generation, masking, and buffer 102 can comprise a hardware-accelerated approach to shift data in frequency. That is, and by way of example, a custom signal can be created that comprises subcarriers of different frequencies, where a component that creates these symbols is turned on, and the data is streaming from a memory, a look up table, etc. In this example, masking can mask the subcarriers on the fly at a rate of symbol by symbol, so that subcarriers can be quickly moved around, as opposed to recreating them.

A buffer of custom signal data memory, generation, masking, and buffer 102 can ensure time alignment of the custom signal. The buffer can buffer (or trigger or gate) the custom signal until determining an appropriate system time (based on time alignment 116) to release it forward in the signal chain.

Time alignment 116 can use system timing of a logic device to advance or slow gating of a data stream. In some examples, this can be an ON/OFF. On other examples, this can operate as a more complex timing/gating pulse where data presence or absence can follow other system timing triggers, such as time-division duplexing (TDD) DL/UL and guard period timing, power amplifier on or off (PA_ON/OFF), symbol start/stop markers, blanking, etc.

Figure 2A:
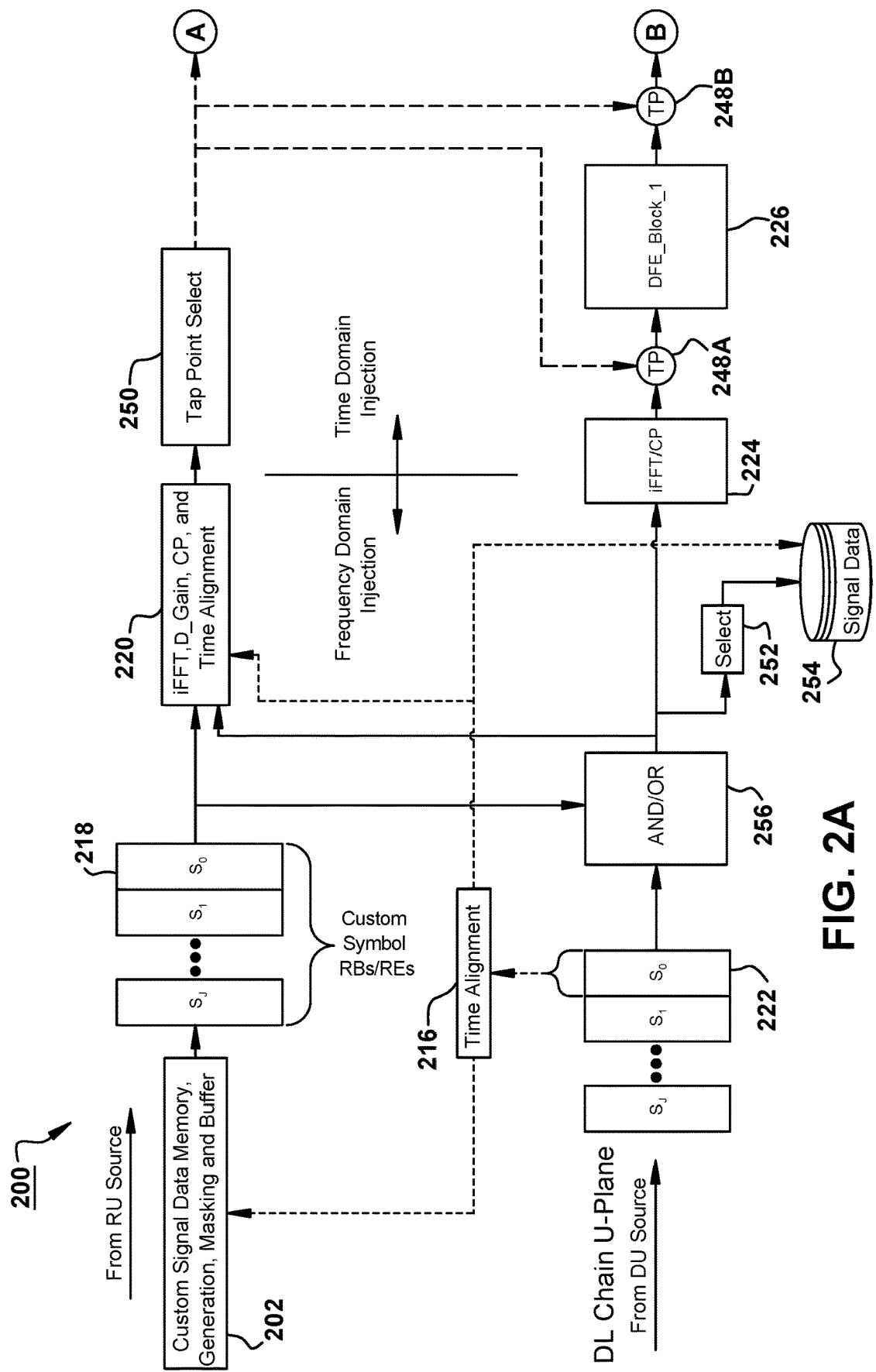
FIGS. 2A and 2B illustrate another example system architecture for injecting a signal into a radio down link chain, and that can facilitate signal injection at radio tap points in a time domain, in accordance with an embodiment of this disclosure.
Figure 2B:
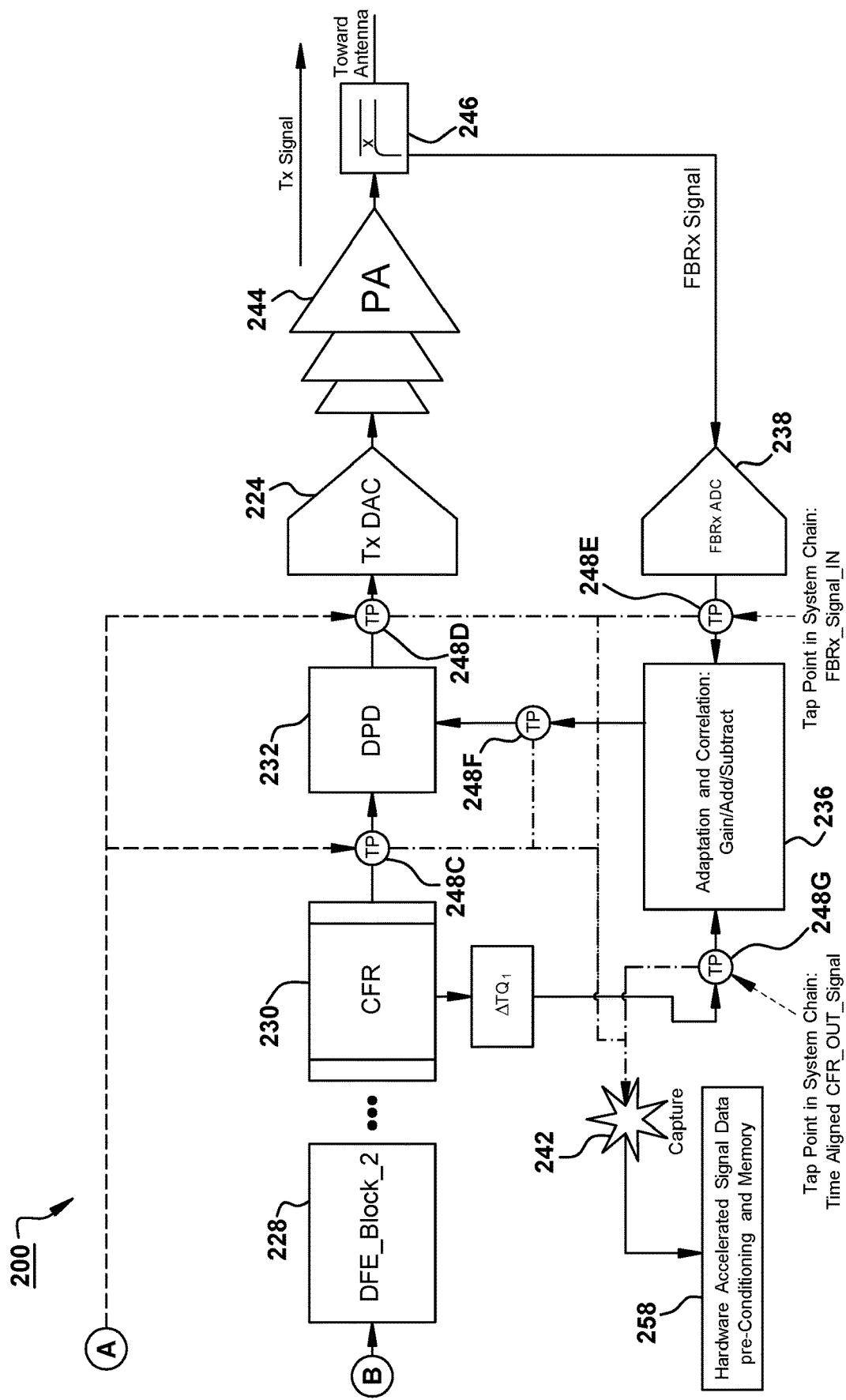

FIGS. 2A and 2B illustrate an example system architecture 200 for injecting a signal into a radio down link chain, and that can facilitate signal injection at radio tap points in a time domain, in accordance with an embodiment of this disclosure.

Relative to system architecture 100 of FIG. 1, system architecture 200 can incorporate capture of a signal accessed via a tap point (capture 242) and analysis of that captured signal (hardware accelerated signal data pre-conditioning and memory 258).

System architecture 200 can function as a down link signal path of radio. In addition to capture 242, and hardware accelerated signal data pre-conditioning and memory 258, as depicted, system architecture 200 comprises custom signal data memory, generation, masking, and buffer 202, time alignment 216, custom symbol RBs/REs 218, iFFT 220, RB/RE 222, iFFT/CP 224, DFE block 2 226, DFE block 2 228, CFR 230, DPD 232, delta-time-phase (ΔTΘ) 234, adaptation and correlation 236, feedback receiver analog-to-digital converter 238, transmitter digital to-analog converter 240, power amplifier 244, signal coupler 246, tap point 248A, tap point 248B, tap point 248C, tap point 248D, tap point 248E, tap point 248F, tap point 248G, tap point select 250, select 252, signal data 254, and AND/OR 256.

These elements of system architecture 200 can be similar to custom signal data memory, generation, masking, and buffer 102, time alignment 116, custom symbol RBs/REs 118, iFFT 120 (which can also perform Δ gain, time alignment, and optional cyclic prefix CP insertion), RB/RE 122, iFFT/CP 124, DFE block 1 126, DFE block 2 128, CFR 130, DPD 132, delta-time-phase (ΔTΘ) 134, adaptation and correlation 136, feedback receiver analog-to-digital converter 138, transmitter digital to-analog converter 140, power amplifier 144, signal coupler 146, tap point 148A, tap point 148B, tap point 148C, tap point 148D, tap point 148E, tap point 148F, tap point 148G, tap point select 150, select 152, signal data 154, and AND/OR 156, respectively.

Figure 3A:
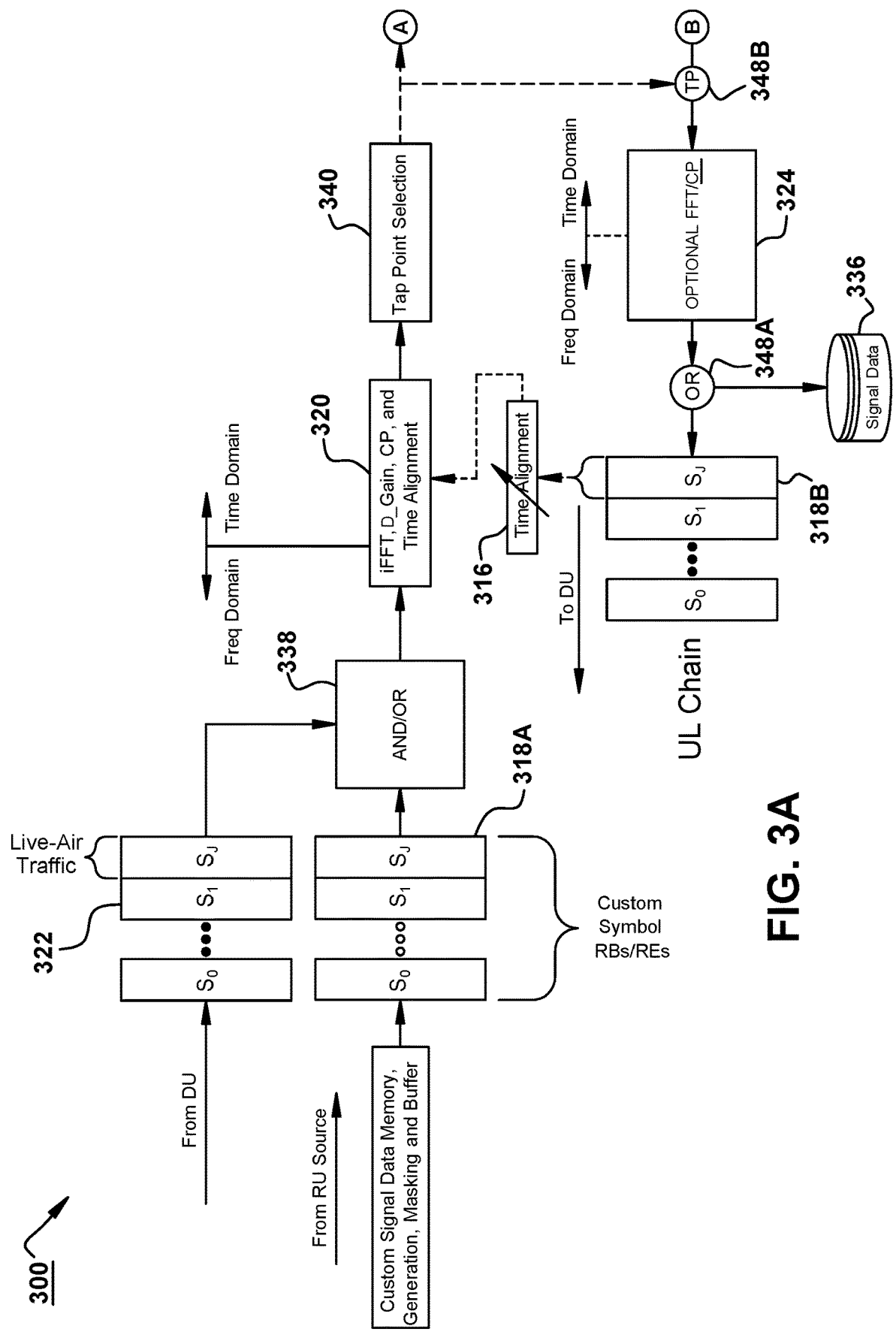
FIGS. 3A and 3B illustrate an example system architecture for injecting a signal into a radio up link chain, and that can facilitate signal injection at radio tap points in a time domain, in accordance with an embodiment of this disclosure.
Figure 3B:
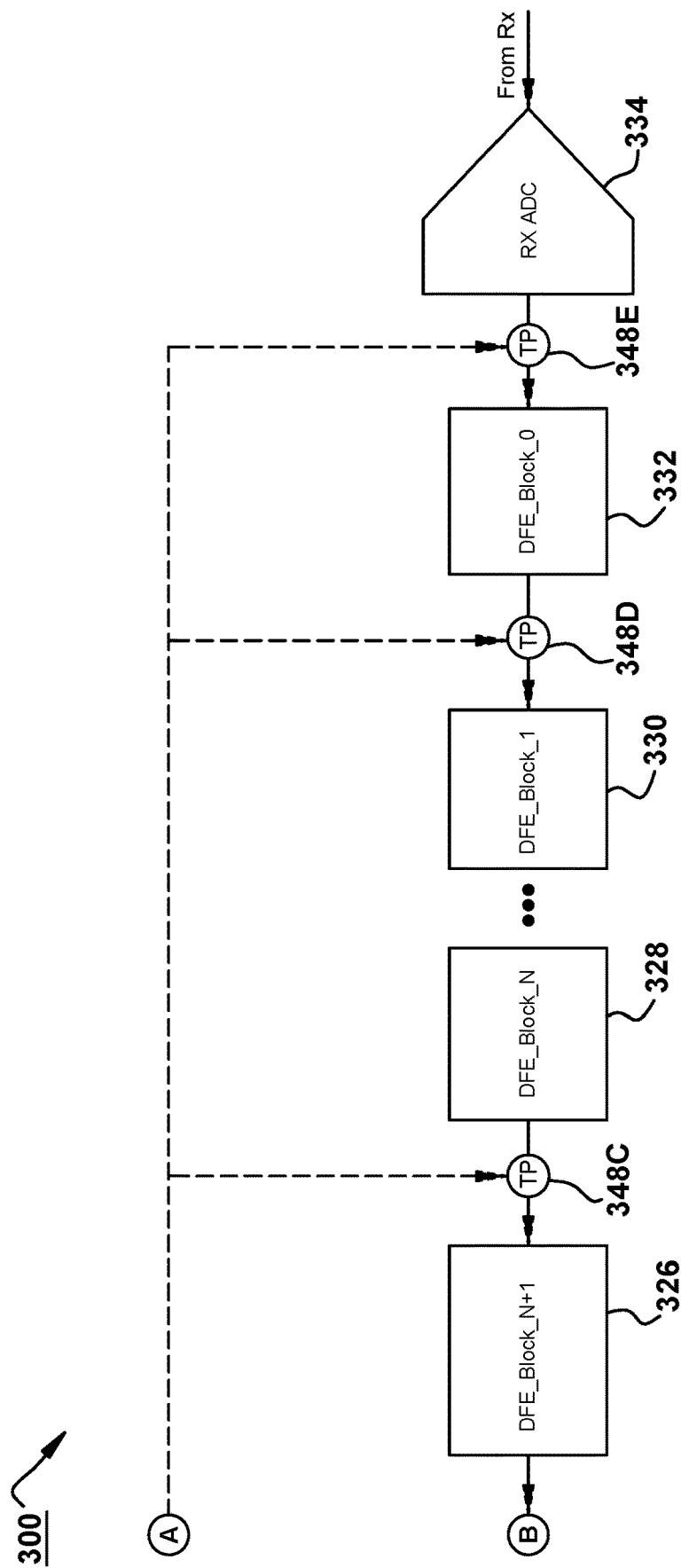

FIGS. 3A and 3B illustrate an example system architecture 300 for injecting a signal into a radio up link chain, and that can facilitate signal injection at radio tap points in a time domain, in accordance with an embodiment of this disclosure. In some examples, a radio can comprise part(s) of system architecture 200 of FIGS. 2A and 2B as a down link chain, and part(s) of system architecture 300 as an up link chain.

As depicted, system architecture 300 comprises custom signal data memory, generation, masking, and buffer 302 (which can be similar to custom signal data memory, generation, masking, and buffer 202 of FIGS. 2A and 2B), time alignment 316 (which can be similar to time alignment 216), custom symbol RBs/REs 318A and custom symbol RBs/REs 318B (which can each be similar to an instance of custom symbol RBs/REs 218; in some examples RBs/REs 318B data can be live-air up link signal data; in some examples RBs/REs 318B data can be a version of RBs/REs 318A data after passing through up link digital front end blocks; in some examples, RBs/REs 318A data is the same as RBs/REs 318B data), iFFT 320 (which can be similar to iFFT 220), RB/RE 322 (which can be similar to RB/RE 222), FFT/CP removal 324, DFE block N+1 326 (which can be similar to DFE block 1 226), DFE block N 328 (which can be similar to DFE block 1 226), DFE block 1 330 (which can be similar to DFE block 1 226), DFE block 0 332 (which can be similar to DFE block 1 226), receiver analog-to-digital converter 334, storage 336, AND/OR 338, tap point selection 340, tap point 348A (which can be similar to an instance of tap point 248A), tap point 348B (which can be similar to an instance of tap point 248A), tap point 348C (which can be similar to an instance of tap point 248A), tap point 348D (which can be similar to an instance of tap point 248A), and tap point 348E (which can be similar to an instance of tap point 248A).

In system architecture 300, custom signal data memory, generation, masking, and buffer 302, time alignment 316, custom symbol RBs/REs 318A, and iFFT 320 can function together to create a custom signal (similar to in FIGS. 2A and 2B, with custom signal data memory, generation, masking, and buffer 202, time alignment 216, custom symbol RBs/REs, and iFFT 220).

This custom signal can then be selectively injected at one or more of tap point 348A, tap point 348B, tap point 348C, tap point 348D, and tap point 348E.

By selectively injecting a signal at a particular tap point, certain blocks of a down link chain can be avoided by the signal. This can be implemented to, for example, selectively measure the performance of a sub-portion of a radio.

Figure 4A:
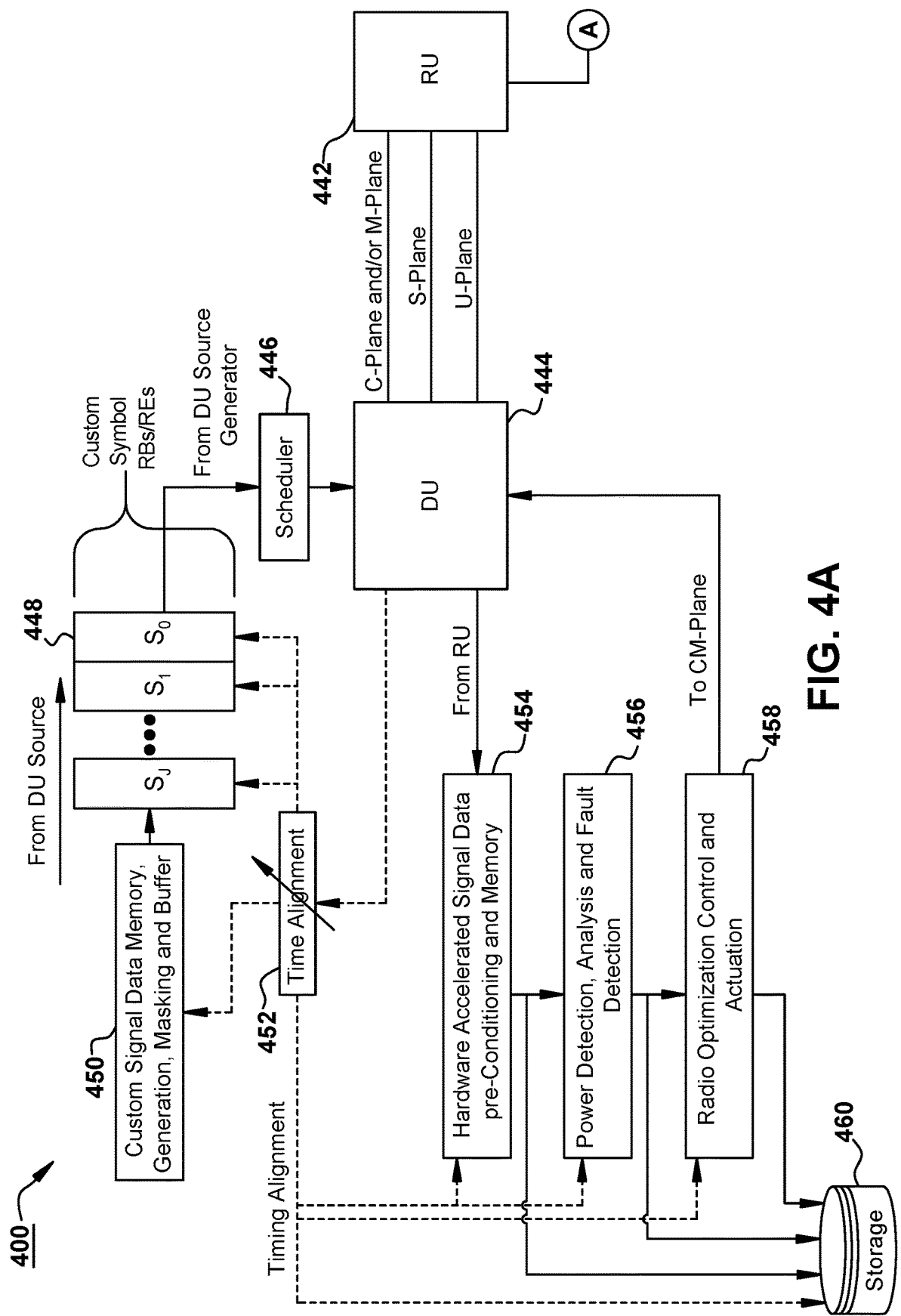
FIGS. 4A and 4B illustrate an example system architecture for a radio unit, and that can facilitate signal injection at radio tap points in a time domain, in accordance with an embodiment of this disclosure.
Figure 4B:
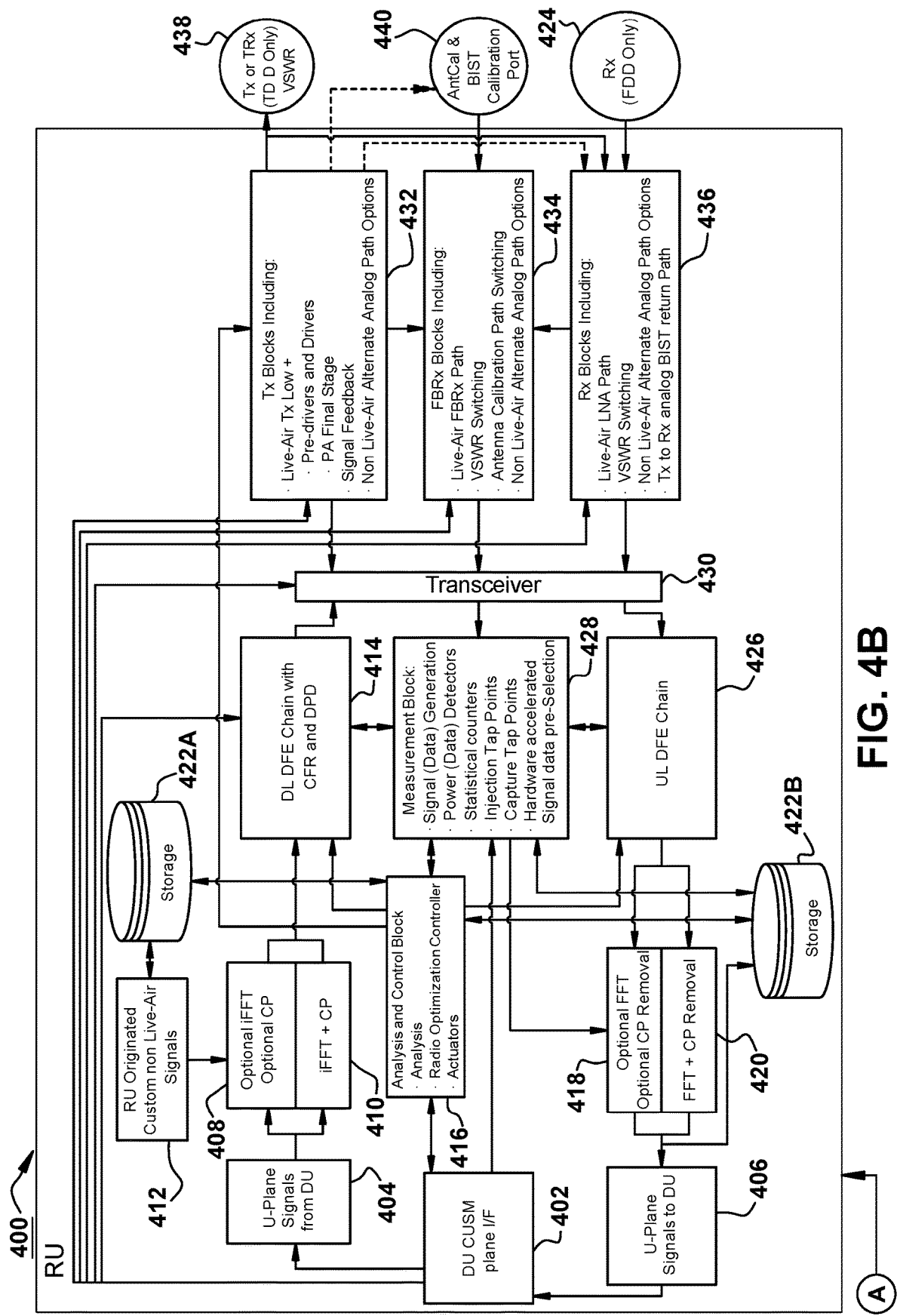
Figure 5A:
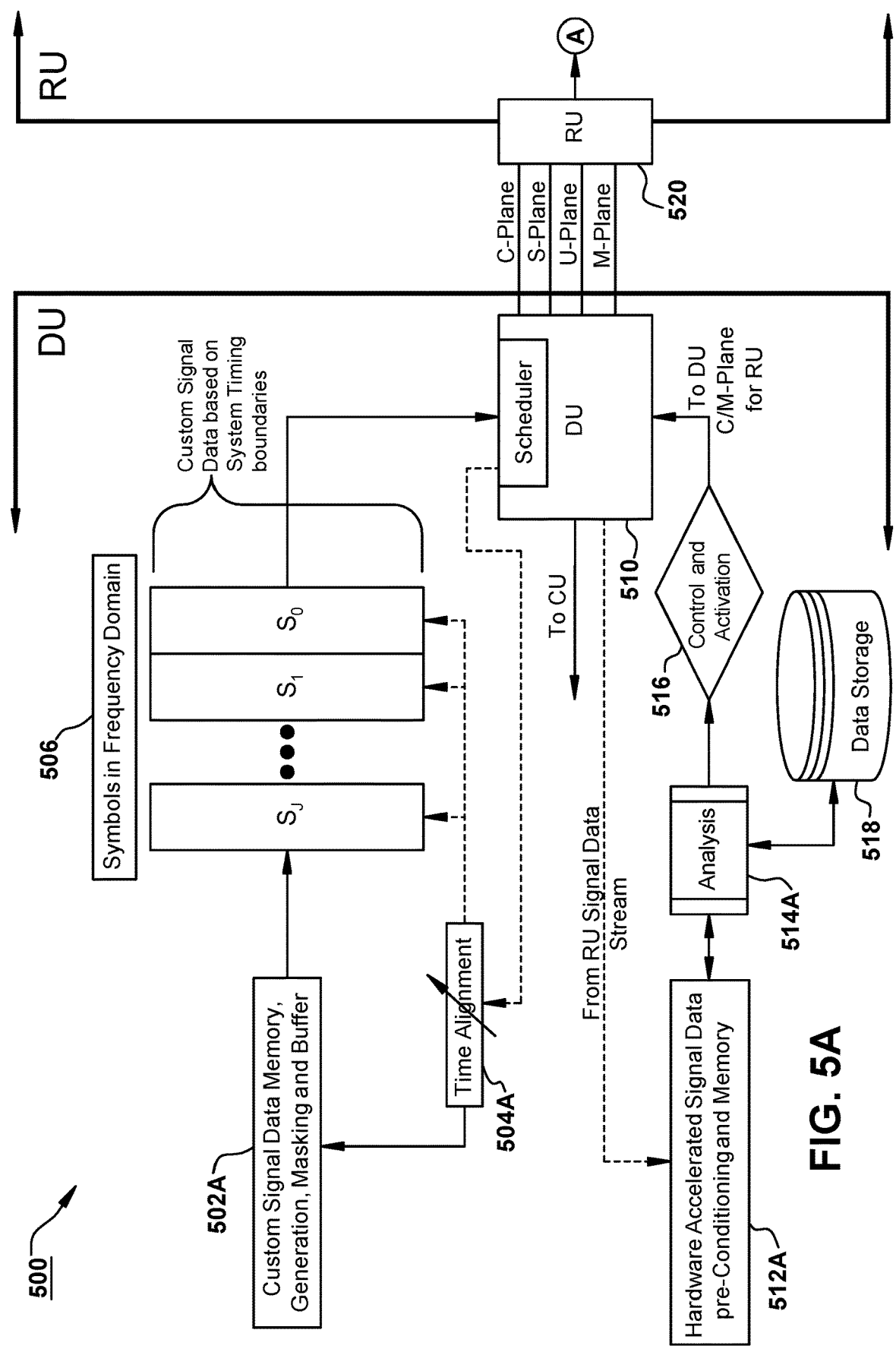
FIGS. 5A, 5B, 5C, and 5D illustrate illustrates an example system architecture for a radio system, and that can facilitate signal injection at radio tap points in a time domain, in accordance with an embodiment of this disclosure.
Figure 5B:
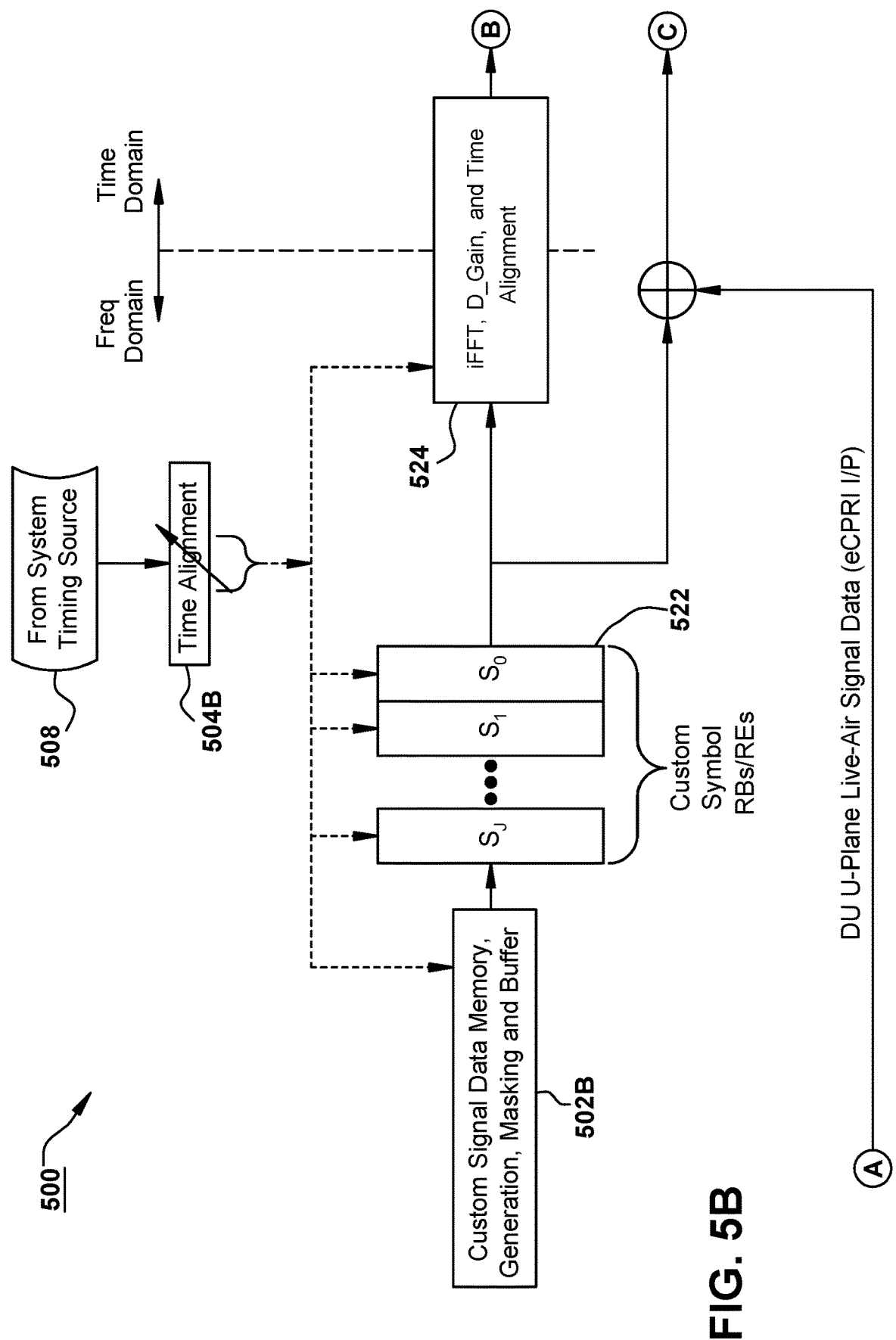
Figure 5C:
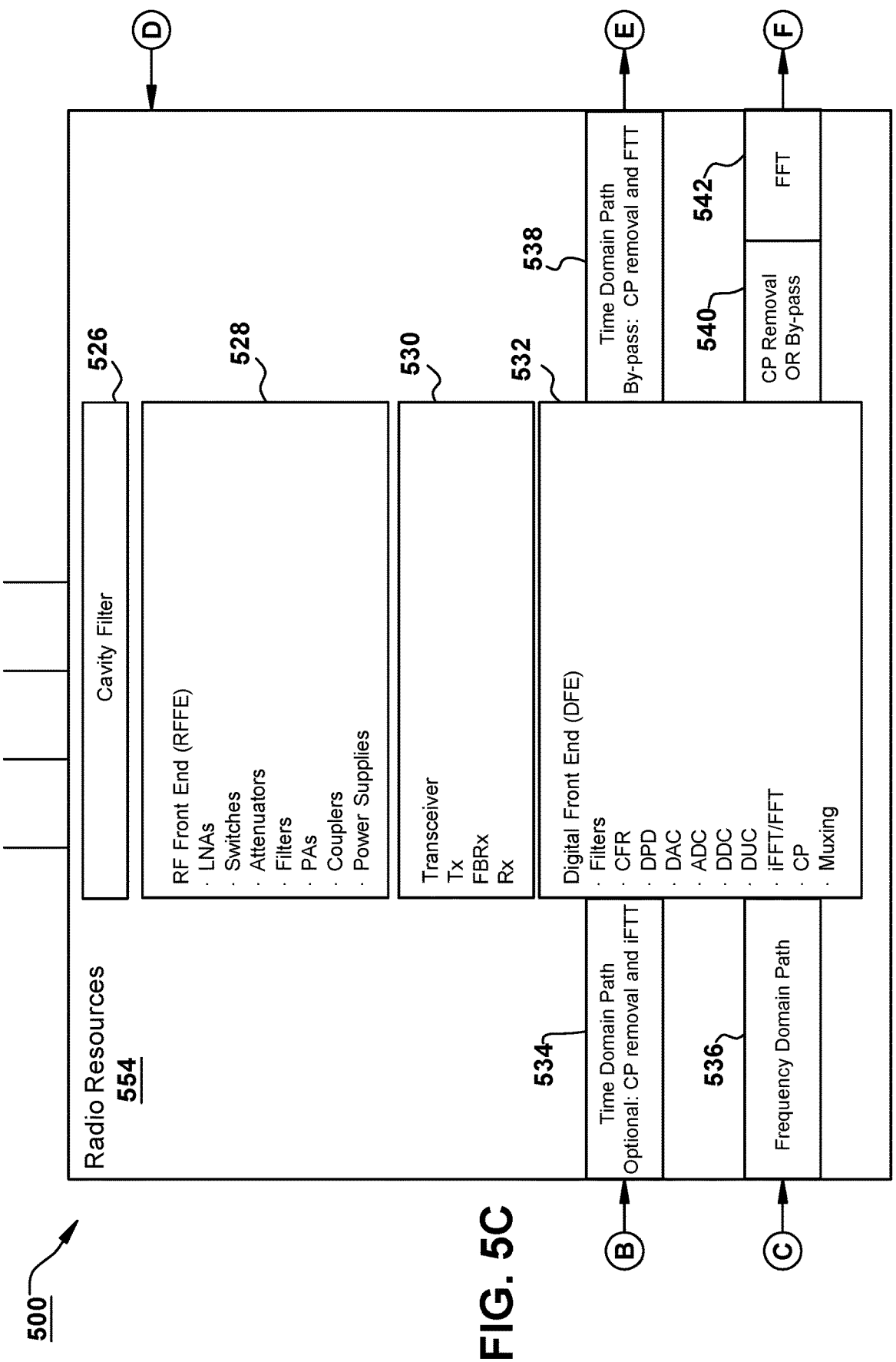
Figure 5D:
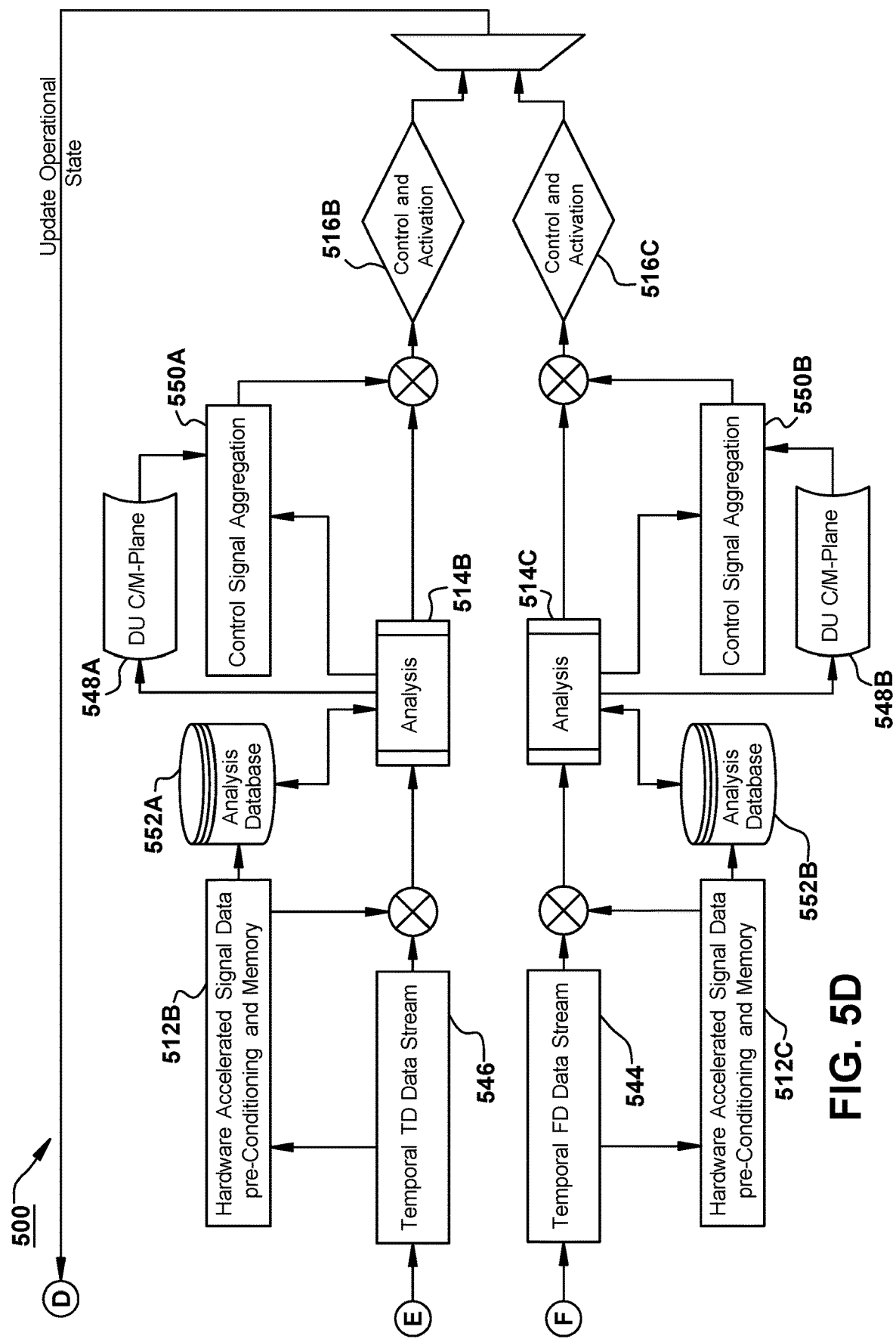

FIGS. 4A and 4B illustrate illustrates an example system architecture 400 for a radio unit, and that can facilitate signal injection at radio tap points in a time domain, in accordance with an embodiment of this disclosure. In some examples, system architecture 400 can comprise a radio unit that comprises part(s) of system architecture 200 of FIGS. 2A and 2B as a down link chain, and part(s) of system architecture 300 of FIGS. 3A and 3B as an up link chain.

As depicted, system architecture 400 comprises distributed unit (DU) control user synchronization management (CUSM) plane intermediate frequency (I/F) 402, live-air traffic signals from DU 404, live-air traffic signals to DU 406, optional iFFT and CP 408, iFFT and CP 410, RU originated custom non-live-air traffic signals 412, DL DFE chain 414, radio optimization controller 416, optional FFT and optional CP removal 418, FFT and CP removal 420, waveform/RB/RE signal data 422A and waveform/RB/RE signal data 422B, Rx 424, UL DFE chain 426, measurement block 428, transceiver 430, transmission (Tx) blocks 432, feedback receiver (FBRx) blocks 434, receiver (Rx) blocks 436, Tx or transceiver (TRx) port 438, and antenna calibration (AntCal) and built-in self-test (BIST) calibration port 440.

DL DFE chain 414 can include CFR and DPD. Measurement block 428 can comprise signal (data) generation, power (data) detectors, statistical counters, injection tap points, capture tap points, and/or hardware accelerated signal data pre-selection.

Tx blocks 432 can include Tx low, pre-drivers and drivers, power amplifier (PA) final stage), signal feedback, and non-live-air traffic alternate analog path options. FBRx blocks 434 can include a live-air traffic FBRx path, voltage standing wave ratio (VSWR) mode switching, and non-live-air traffic alternate analog path options. Rx blocks 436 can include a live-air traffic low noise amplifier (LNA) path, VSWR switching, and non-live-air traffic analog path options. RU 442 can include a separate port for the case of frequency-division duplexing (FDD) radio architectures.

These above components of system architecture 400 can be part of radio unit (RU) 442. System architecture 400 also comprises distributed unit (DU) 444, scheduler 446, custom symbol resource blocks/resource elements (RBs/REs) 448, custom signal data memory, generation, masking, and buffer 450, time alignment 452, hardware accelerated signal data pre-conditioning and memory 454, analysis and fault detection 456, radio optimization control and actuation 458, and storage 460.

In system architecture 400, custom signals can be generated and then injected into tap points in either a DL chain or an UL chain. Custom signals can be generated at RU originated custom non-live-air traffic signals 412, and in some examples, combined with live-air traffic signals from DU 404. The resulting signal can be injected into various parts of DL DFE chain 414 (via optional iFFT/optional CP 408) or UL DFE chain 426 via tap points of measurement block 428.

FIGS. 5A, 5B, 5C, and 5D illustrate an example system architecture 500 for a radio system, and that can facilitate signal injection at radio tap points in a time domain, in accordance with an embodiment of this disclosure. In some examples, system architecture can comprise a radio system that can comprise part(s) of system architecture 100 of FIG. 1, system architecture 200 of FIGS. 2A and 2B, system architecture 300 of FIGS. 3A and 3B, and/or system architecture 400 of FIGS. 4A and 4B.

As depicted, system architecture 500 comprises custom signal data memory, generation, masking, and buffer 502A and custom signal data memory, generation, masking, and buffer 502B; time alignment 504A and time alignment 504B; custom symbol RBs/REs 506; from timing system source 508; distributed unit 510; hardware accelerated signal data, pre-conditioning and memory 512A, hardware accelerated signal data, pre-conditioning and memory 512B, and hardware accelerated signal data, pre-conditioning and memory 512C; analysis 514A, analysis 514B, and analysis 514C; control and activation 516A, control and activation 516B, and control and activation 516C; data storage 518; RU 520; custom symbol RBs/REs 522; inverse Fast Fourier Transform (iFFT) 524 (which can also perform Δ gain, cyclic prefix insertion, and time alignment); cavity filter 526; radiofrequency (RF) front end (RFFE) 528 (which can include low noise amplifiers (LNAs), switches, attenuators, filters, PAs, couplers, and power supplies); transceiver 530 (which can include Tx, FBRx, and Rx); digital front end 532 (which can include filters, CFR, DPD, a digital to analog converter (DACs), an analog to digital converter (ADC), a digital down converters (DDC), a digital up converter (DUC), and iFFT/FFT, CP, and muxing); time domain path 534 (which can bypass CP injection and iFFT); frequency domain path 536; time domain path 538 (which can bypass CP removal and FFT); CP removal or bypass 540; FFT 542; temporal frequency domain (FD) data stream 544; temporal time domain (TD) data stream 546; DU C/M-plane 548A and DU C/M-plane 548B; control system aggregation 550A and control system aggregation 550B; analysis database 552A and analysis database 552B; and radio resources 554.

Hardware accelerated signal data pre-conditioning and memory 512A, and hardware accelerated signal data pre-conditioning and memory 512C can perform frequency domain signal data detection.

Hardware accelerated signal data pre-conditioning and memory 512B can perform time domain signal data detection.

Custom signal data memory, generation, masking, and buffer 502A and custom signal data memory, generation, masking, and buffer 502B can perform signal generation at a distributed unit or a radio unit, respectively. They can perform local synchronized custom and live-air data stimulus with known characteristics. In some examples, they can operate in a frequency domain.

Analysis 514A, analysis 514B, and analysis 514C can perform signal capture data analysis. In some examples, they can implement artificial intelligence/machine learning (AI/ML) with training (such as live and stored real-time data, and statistical data). They can provide an output of a response to actuators to change operational parameters of a radio system.

Control and activation 516A, control and activation 516B, and control and activation 516C can take inputs that augment information available to an AI/ML component and output an affect to actuators of the radio system to change operational parameters.

In some examples, respective outputs of control and activation 516B and control and activation 516C can be aggregated to affect change on a radio and radio performance.

In system architecture 500, custom signals can be generated and then injected into tap points in either a DU or an RU. Regarding the DU, the custom signals can be originated from custom signal data memory, generation, masking, and buffer 502A (which can be similar to custom signal data memory, generation, masking, and buffer 202 of FIGS. 2A and 2B, in conjunction with time alignment 504A). Regarding the RU, the custom signals can be originated from custom signal data memory, generation, masking, and buffer 502B (which can comprise a combination of components similar to custom signal data memory, generation, masking, and buffer 302 of FIGS. 3A and 3B, in conjunction with time alignment 504B).

Figure 6:
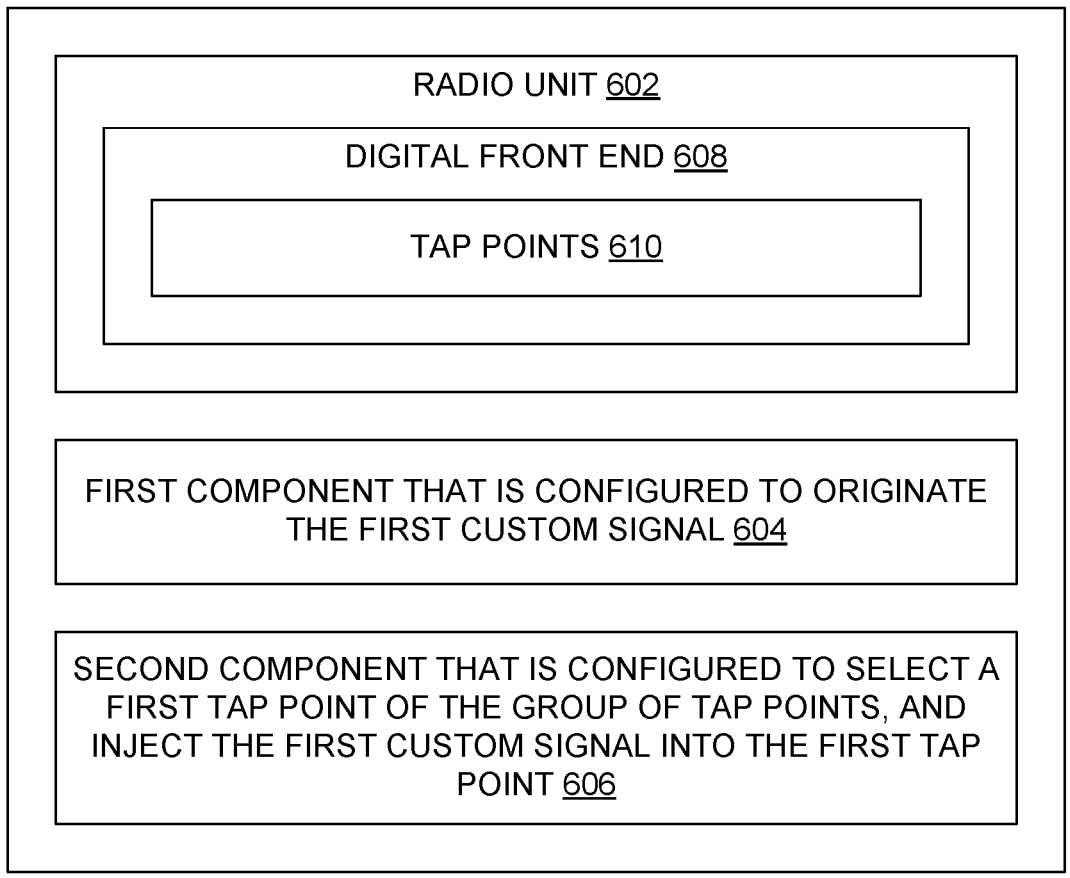
FIG. 6 illustrates an example system architecture that can facilitate signal injection at radio tap points in a time domain, in accordance with an embodiment of this disclosure.

FIG. 6 illustrates an example system architecture 600 that can facilitate signal injection at radio tap points in a time domain, in accordance with an embodiment of this disclosure. In some examples, part(s) of system architecture 600 can be used to implement part(s) of system architecture 100 of FIG. 1, system architecture 200 of FIGS. 2A and 2B, system architecture 300 of FIGS. 3A and 3B, system architecture 400 of FIGS. 4A and 4B, and/or system architecture 500 of FIGS. 5A, 5B, 5C, and 5D.

System architecture 600 comprises radio unit 602, first component that is configured to originate the first custom signal 604, and second component that is configured to select a first tap point of the group of tap points, and inject the first custom signal into the first tap point 606. In turn, radio unit 602 comprises digital front end 608, which itself comprises tap points 610.

Radio unit 602 can be similar to system architecture 400 of FIGS. 4A and 4B. First component that is configured to originate the first custom signal 604 can be similar to custom signal data memory, generation, masking, and buffer 202 of FIGS. 2A and 2B. First component that is configured to originate the first custom signal 604 originate the signal from one, or a combination of multiple, of components of custom signal data memory, generation, masking, and buffer 202, such as a memory, a look up table, a pseudo-random look up table generator, or a generator.

Using the example of FIGS. 2A and 2B, second component that is configured to select a first tap point of the group of tap points, and inject the first custom signal into the first tap point 606 can be similar to tap point select 250, and select a first tap point from among tap point 248A, tap point 248B, tap point 248C, tap point 248D, tap point 248E, tap point 248F, and tap point 248G, and inject the custom signal into this selected first tap point.

In some examples, the first tap point is positioned in a down link path of the radio unit. This can be, for example, tap point 248A of FIGS. 2A and 2B. In some examples, the first tap point is positioned in an up link path of the radio unit. This can be, for example, tap point 348B of FIGS. 3A and 3B. In some examples, the first tap point is positioned in a feedback path of the radio unit. This can be, for example, tap point 248E of FIGS. 2A and 2B.

In some examples, the second component is configured to inject the first custom signal into the first tap point in a time domain portion of the radio unit. This can be, for example, tap point 248A, tap point 248B, tap point 248C, tap point 248D, tap point 248E, and tap point 248F of FIGS. 2A and 2B. Each of these tap points is positioned in a time domain portion of a radio unit, as opposed to a frequency domain portion of the radio unit.

Figure 7:
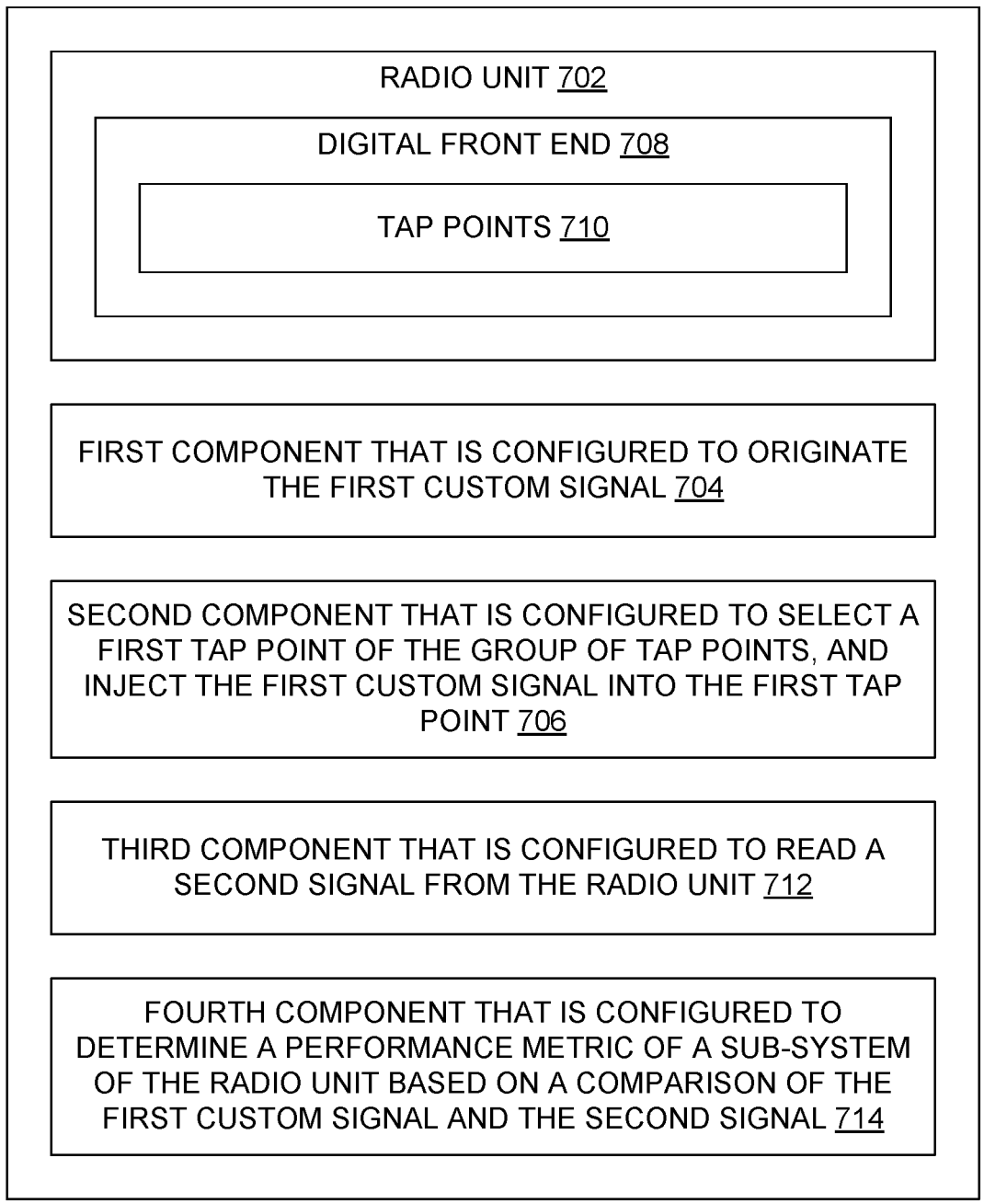
FIG. 7 illustrates another example system architecture that can facilitate signal injection at radio tap points in a time domain, in accordance with an embodiment of this disclosure.

FIG. 7 illustrates another example system architecture 700 that can facilitate signal injection at radio tap points in a time domain, in accordance with an embodiment of this disclosure. In some examples, part(s) of system architecture 700 can be used to implement part(s) of system architecture 100 of FIG. 1, FIGS. 2A and 2B, system architecture 300 of FIGS. 3A and 3B, system architecture 400 of FIGS. 4A and 4B, and/or system architecture 500 of FIGS. 5A, 5B, 5C, and 5D.

System architecture comprises radio unit 702 (which can be similar to radio unit 602 of FIG. 6), first component that is configured to originate the first custom signal 704 (which can be similar to first component that is configured to originate the first custom signal 604), second component that is configured to select a first tap point of the group of tap points, and inject the first custom signal into the first tap point 706 (which can be similar to second component that is configured to select a first tap point of the group of tap points, and inject the first custom signal into the first tap point 606), digital front end 708 (which can be similar to digital front end 608), tap points 710 (which can be similar to tap points 610), third component that is configured to read a second signal from the radio unit 712, and fourth component that is configured to determine a performance metric of a sub-system of the radio unit based on a comparison of the first custom signal and the second signal 714.

Using the example of FIGS. 2A and 2B, second component that is configured to select a first tap point of the group of tap points, and inject the first custom signal into the first tap point 706 can inject a signal at one tap point, and third component that is configured to read a second signal from the radio unit 712 can read the signal at another tap point. For example, second component that is configured to select a first tap point of the group of tap points, and inject the first custom signal into the first tap point 706 can inject a signal at tap point 248A of FIGS. 2A and 2B, and third component that is configured to read a second signal from the radio unit 712 can read the signal at tap point 248B, similar to tap point select 250.

Then, fourth component that is configured to determine a performance metric of a sub-system of the radio unit based on a comparison of the first custom signal and the second signal 714 can use the difference between the signal injected at tap point 248A and the corresponding signal read at tap point 248B to determine performance of a portion of a radio located between those two points. In the example of FIGS. 2A and 2B, this is DFE block 2 226.

Figure 8:
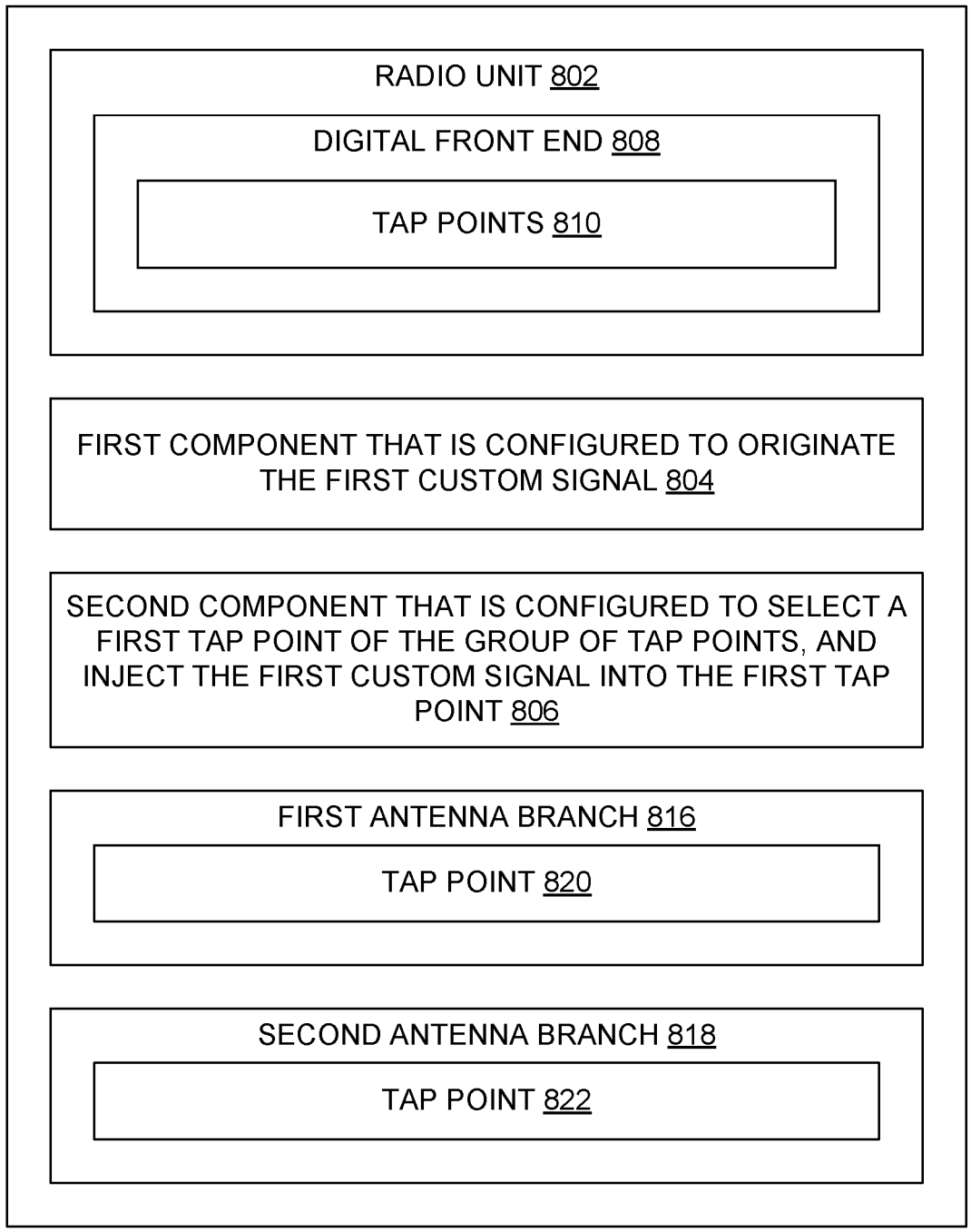
FIG. 8 illustrates another example system architecture that can facilitate signal injection at radio tap points in a time domain, in accordance with an embodiment of this disclosure.

FIG. 8 illustrates another example system architecture 800 that can facilitate signal injection at radio tap points in a time domain, in accordance with an embodiment of this disclosure. In some examples, part(s) of system architecture 800 can be used to implement part(s) of system architecture 100 of FIG. 1, FIGS. 2A and 2B, system architecture 300 of FIGS. 3A and 3B, system architecture 400 of FIGS. 4A and 4B, and/or system architecture 500 of FIGS. 5A, 5B, 5C, and 5D.

System architecture comprises radio unit 802 (which can be similar to radio unit 602 of FIG. 6), first component that is configured to originate the first custom signal 804 (which can be similar to first component that is configured to originate the first custom signal 604), second component that is configured to select a first tap point of the group of tap points, and inject the first custom signal into the first tap point 806 (which can be similar to second component that is configured to select a first tap point of the group of tap points, and inject the first custom signal into the first tap point 606), digital front end 808 (which can be similar to digital front end 608), tap points 810 (which can be similar to tap points 610), first antenna branch 816 (comprising tap point 820), and second antenna branch 818 (comprising tap point 822).

Each of tap point 820 and tap point 822 can be similar to an instance of tap point 248A of FIGS. 2A and 2B. In system architecture 800, tap point 820 and tap point 822 are positioned in different antenna branches (where system architecture 800 comprises multiple antenna branches). Tap point 820 is positioned in first antenna branch 816, and tap point 822 is positioned in second antenna branch 818.

In some examples, the first tap point corresponds to the first antenna branch, and wherein the second component is configured to inject a second custom signal into the second antenna branch. That is, multiple different signals can be injected into the respective tap points of different antennas. In other examples, the same signal can be injected into the respective tap points of different antennas.

In some examples, the first custom signal differs from the second custom signal, and the second component is configured to inject the first custom signal into the first tap point concurrently with injecting the second custom signal into the second antenna branch. That is, the injection of multiple custom signals can be performed simultaneously, so that system architecture 800 receives multiple custom signals at the same time.

FIG. 9 illustrates another example system architecture 900 that can facilitate signal injection at radio tap points in a time domain, in accordance with an embodiment of this disclosure. In some examples, part(s) of system architecture 900 can be used to implement part(s) of system architecture 100 of FIG. 1, FIGS. 2A and 2B, system architecture 300 of FIGS. 3A and 3B, system architecture 400 of FIGS. 4A and 4B, and/or system architecture 500 of FIGS. 5A, 5B, 5C, and 5D.

System architecture 900 comprises first component that is configured to originate a first custom signal 902, second component that is configured to select a first tap point of a group of tap points of a digital front end of a radio unit 904, and third component that is configured to inject the first custom signal into the first tap point 906.

In some examples, first component that is configured to originate a first custom signal 902 can be similar to first component that is configured to originate the first custom signal 604 of FIG. 6; second component that is configured to select a first tap point of a group of tap points of a digital front end of a radio unit 904 can be similar to a portion of second component that is configured to select a first tap point of the group of tap points, and inject the first custom signal into the first tap point 606 that selects a tap point; and third component that is configured to inject the first custom signal into the first tap point 906 can be similar to a portion of second component that is configured to select a first tap point of the group of tap points, and inject the first custom signal into the first tap point 606 that injects a signal into a tap point.

In some examples, the first custom signal in system architecture 900 bypasses a block of the radio unit that is configured to translate frequency domain data into time domain data and insert a cyclic prefix when injected into the first tap point. That is, using the example of FIGS. 2A and 2B, injected data can bypass iFFT/CP 224 and be injected at tap point 248A.

In some examples, the first custom signal comprises live-air traffic data that is sourced from a distributed unit of a radio, wherein the radio comprises the radio unit. In some examples, the first custom signal comprises a combination of live-air traffic data that is sourced from a distributed unit of a radio, and custom data, wherein the radio comprises the radio unit. That is, data can be a combination of mission data sourced from a distributed unit and non-live-air traffic sources, solely live-air traffic data, or solely non-live-air traffic data.

Figure 10:
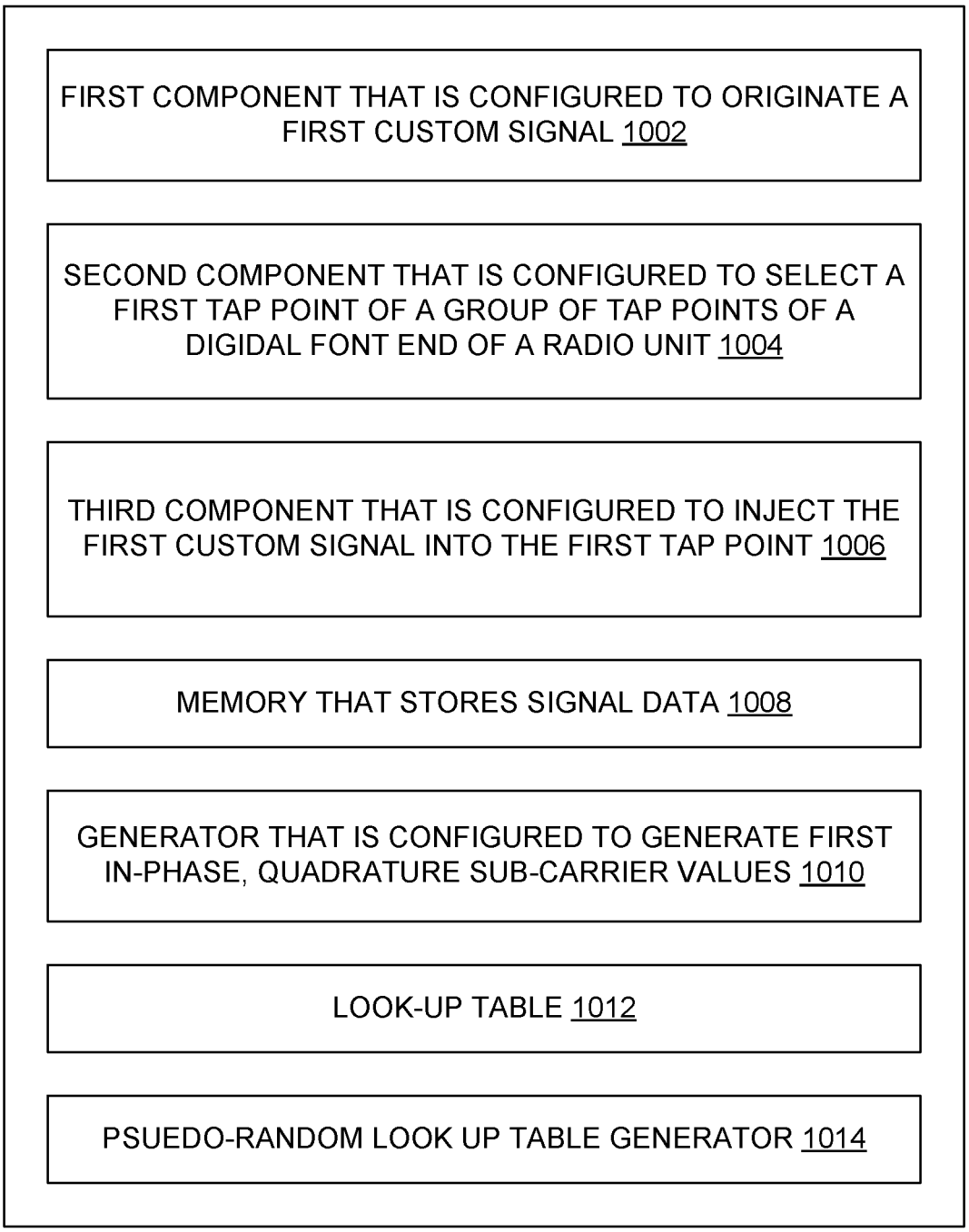
FIG. 10 illustrates another example system architecture that can facilitate signal injection at radio tap points in a time domain, in accordance with an embodiment of this disclosure.

FIG. 10 illustrates another example system architecture that can facilitate signal injection at radio tap points in a time domain, in accordance with an embodiment of this disclosure. In some examples, part(s) of system architecture 1000 can be used to implement part(s) of system architecture 100 of FIG. 1, FIGS. 2A and 2B, system architecture 300 of FIGS. 3A and 3B, system architecture 400 of FIGS. 4A and 4B, and/or system architecture 500 of FIGS. 5A, 5B, 5C, and 5D.

System architecture 1000 comprises first component that is configured to originate a first custom signal 1002 (which can be similar to first component that is configured to originate a first custom signal 902 of FIG. 9), second component that is configured to select a first tap point of a group of tap points of a digital front end of a radio unit 1004 (which can be similar to second component that is configured to select a first tap point of a group of tap points of a digital front end of a radio unit 904), third component that is configured to inject the first custom signal into the first tap point 1006 (which can be similar to third component that is configured to inject the first custom signal into the first tap point 906), memory that stores signal data 1008, generator that is configured to generate first in-phase, quadrature sub-carrier values 1010, look up table 1012, and pseudo-random look up table generator 1014.

In some examples, memory that stores signal data 1008, generator that is configured to generate first in-phase, quadrature sub-carrier values 1010, look up table that stores predetermined second in-phase, quadrature sub-carrier values 1012, and pseudo-random look up table generator that is configured to operate on the predetermined second in-phase, quadrature sub-carrier values to produce a pseudo-random symbol of data values 1014 can be similar to components of custom signal data memory, generation, masking, and buffer 102 of FIG. 1.

Figure 11:
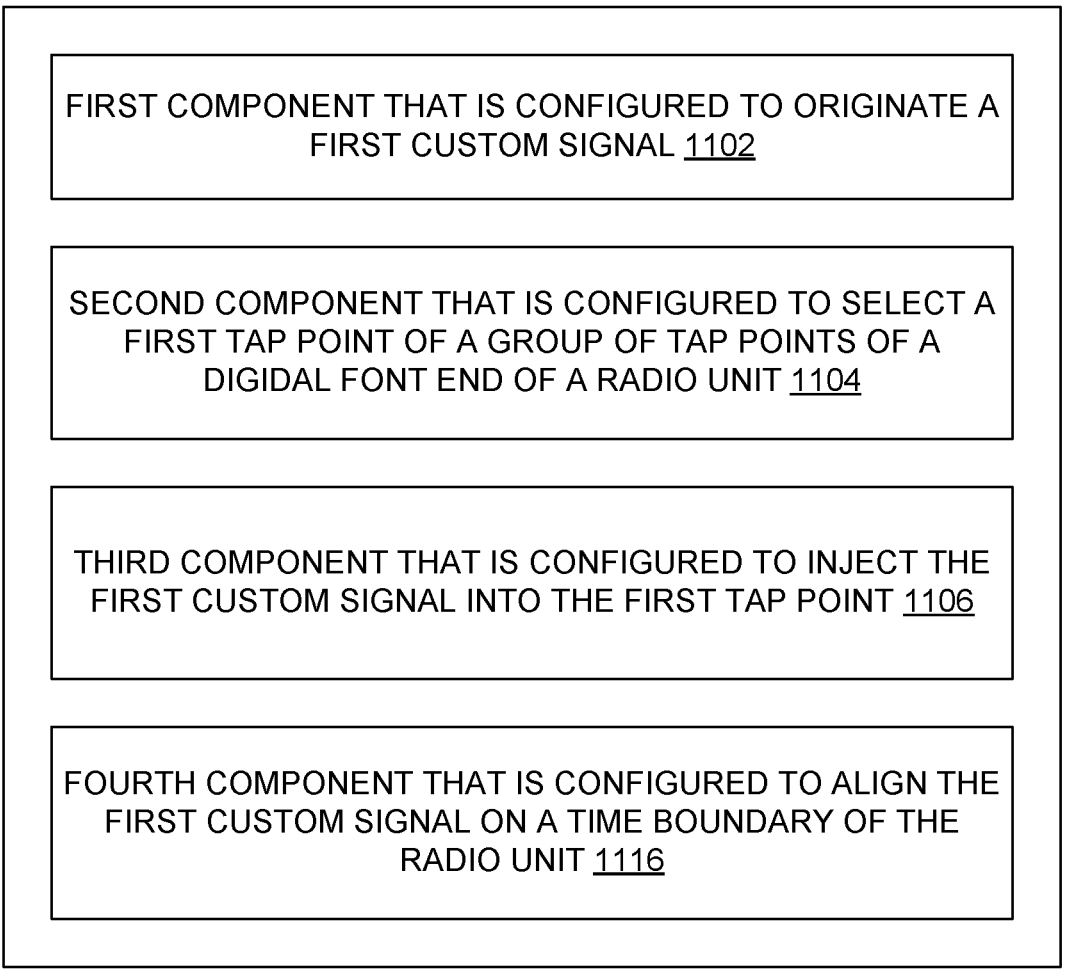
FIG. 11 illustrates another example system architecture that can facilitate signal injection at radio tap points in a time domain, in accordance with an embodiment of this disclosure.

FIG. 11 illustrates another example system architecture that can facilitate signal injection at radio tap points in a time domain, in accordance with an embodiment of this disclosure. In some examples, part(s) of system architecture 1100 can be used to implement part(s) of system architecture 100 of FIG. 1, FIGS. 2A and 2B, system architecture 300 of FIGS. 3A and 3B, system architecture 400 of FIGS. 4A and 4B, and/or system architecture 500 of FIGS. 5A, 5B, 5C, and 5D.

System architecture 1100 comprises first component that is configured to originate a first custom signal 1102 (which can be similar to first component that is configured to originate a first custom signal 902 of FIG. 9), second component that is configured to select a first tap point of a group of tap points of a digital front end of a radio unit 1104 (which can be similar to second component that is configured to select a first tap point of a group of tap points of a digital front end of a radio unit 904), third component that is configured to inject the first custom signal into the first tap point 1106 (which can be similar to third component that is configured to inject the first custom signal into the first tap point 906), and fourth component that is configured to align the first custom signal on a time boundary of the radio unit 1116.

In some examples, fourth component that is configured to align the first custom signal on a time boundary of the radio unit 1116 can be similar to iFFT 220 of FIGS. 2A and 2B. That is, in the example of FIGS. 2A and 2B, time alignment 216 can comprise a block that derives a signal used by a mechanism that aligns data, and this mechanism that aligns data can be part of iFFT 220.

FIG. 12 illustrates another example system architecture that can facilitate signal injection at radio tap points in a time domain, in accordance with an embodiment of this disclosure. In some examples, part(s) of system architecture 1200 can be used to implement part(s) of system architecture 200 of FIGS. 2A and 2B, system architecture 300 of FIGS. 3A and 3B, system architecture 400 of FIGS. 4A and 4B, and/or system architecture 500 of FIGS. 5A, 5B, 5C, and 5D.

System architecture 1200 comprises first component that is configured to originate a first custom signal 1202 (which can be similar to first component that is configured to originate a first custom signal 902 of FIG. 9), second component that is configured to select a first tap point of a group of tap points of a digital front end of a radio unit 1204 (which can be similar to second component that is configured to select a first tap point of a group of tap points of a digital front end of a radio unit 904), third component that is configured to inject the first custom signal into the first tap point 1206 (which can be similar to third component that is configured to inject the first custom signal into the first tap point 906), and fourth component that is configured adjust a gain of the first custom signal before the second component injects the first custom signal into the first tap point 1218.

In some examples, fourth component that is configured adjust a gain of the first custom signal before the second component injects the first custom signal into the first tap point 1218 can be similar to iFFT 220 of FIGS. 2A and 2B.

Example Process Flow

Figure 13:
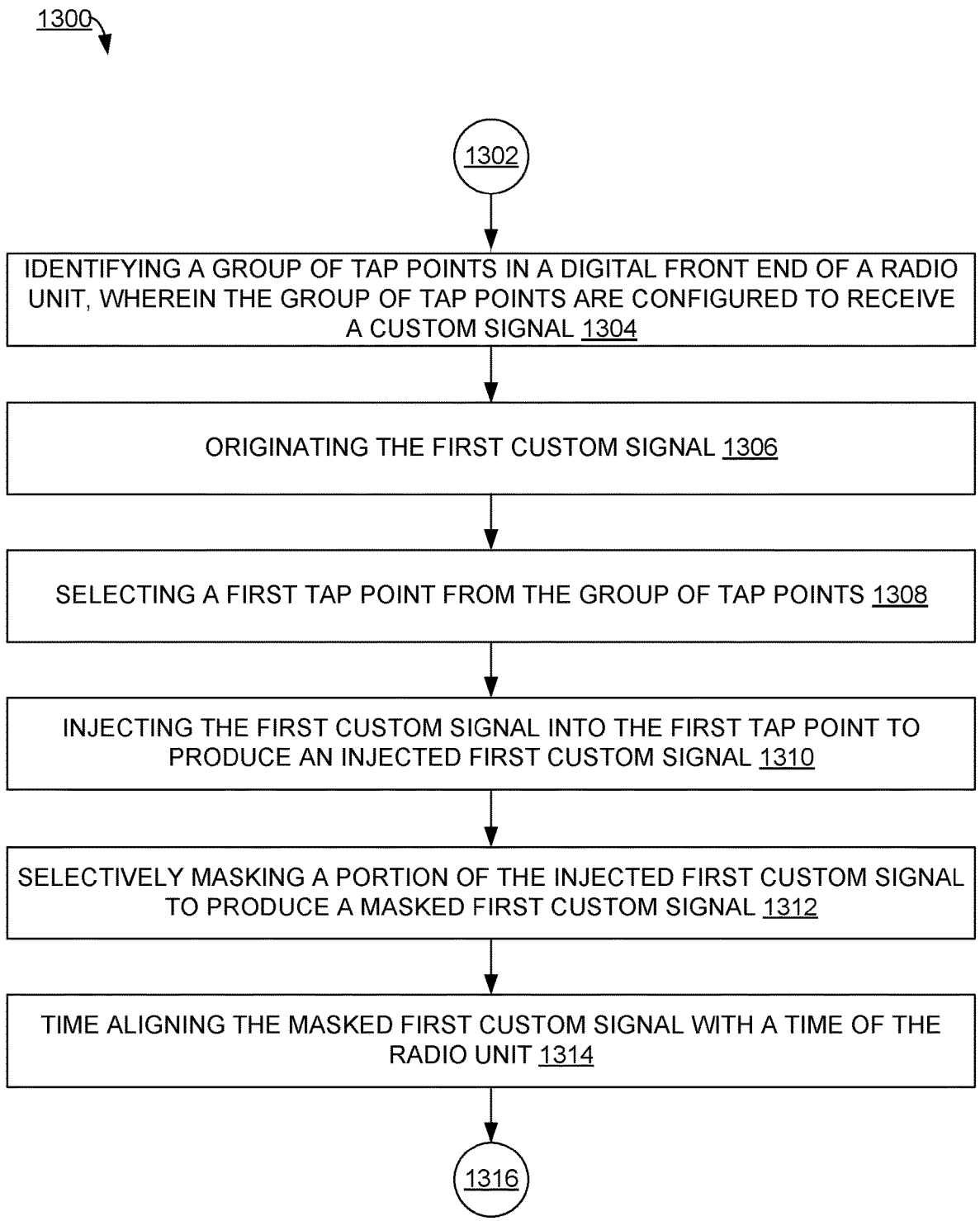
FIG. 13 illustrates an example process flow that can facilitate signal injection at radio tap points in a time domain, in accordance with an embodiment of this disclosure.

FIG. 13 illustrates an example process flow 1300 that can facilitate signal injection at radio tap points in a time domain, in accordance with an embodiment of this disclosure. In some examples, one or more embodiments of process flow 1300 can be implemented by system architecture 200 of FIGS. 2A and 2B.

It can be appreciated that the operating procedures of process flow 1300 are example operating procedures, and that there can be embodiments that implement more or fewer operating procedures than are depicted, or that implement the depicted operating procedures in a different order than as depicted.

Process flow 1300 begins with 1302, and moves to operation 1304.

Operation 1304 depicts identifying, by a system comprising a processor, a group of tap points in a digital front end of a radio unit, wherein the group of tap points are configured to receive a first custom signal. In some examples, these tap points can comprise tap point 248A, tap point 248B, tap point 248C, tap point 248D, tap point 248E, and tap point 248F of FIGS. 2A and 2B. Identifying these tap points can comprise storing an indication of a location of these tap points within a radio in a computer memory, or otherwise determining (or maintaining information regarding) which part of a radio system each tap point is located in.

After operation 1304, process flow 1300 moves to operation 1306.

Operation 1306 depicts originating the first custom signal. This can comprise originating a signal from custom signal data memory, generation, masking, and buffer 202 FIGS. 2A and 2B.

After operation 1306, process flow 1300 moves to operation 1308.

Operation 1308 depicts selecting a first tap point from the group of tap points. Using the example of FIGS. 2A and 2B (with tap point 248A, tap point 248B, tap point 248C, tap point 248D, tap point 248E, and tap point 248F), this can comprise determining which of these tap points the custom signal of operation 1306 will be injected into.

After operation 1308, process flow 1300 moves to operation 1310.

Operation 1310 depicts injecting, by the system, the first custom signal into the first tap point to produce an injected first custom signal. This can comprise injecting the first custom signal that is originated in operation 1306 into the first tap point that is selected in operation 1308, and can be performed by a component similar to tap point select 250 of FIGS. 2A and 2B, or tap point selection 340 of FIGS. 3A and 3B.

In some examples, the first custom signal passes through one digital front end block of the radio unit when injected into the first tap point. In some examples, the first custom signal passes through multiple digital front end blocks of the radio unit when injected into the first tap point. That is, when injected into a specific tap point, a custom signal can then pass through one, or multiple, digital front end blocks. In some examples, the first custom signal passes to an analog portion of a signal chain of the radio unit when injected into the first tap point. That is, injected data can pass to an analog portion of a radio's signal chain.

After operation 1310, process flow 1300 moves to operation 1312.

Operation 1312 depicts selectively masking a portion of the injected first custom signal to produce a masked first custom signal. In some examples, operation 1312 can be implemented by a masking component of custom signal data memory, generation, masking, and buffer 202 of FIGS. 2A and 2B.

After operation 1312, process flow 1300 moves to operation 1314.

Operation 1314 depicts time aligning the masked first custom signal with a time of the radio unit. In some examples, operation 1314 can be implemented by time alignment 216 of FIGS. 2A and 2B. In some examples, operation 1314 comprises reading a second signal from the radio unit (which can be performed in a manner similar to third component that is configured to read a second signal from the radio unit 712 of FIG. 7), and determining a performance metric of a sub-system of the radio unit based on a comparison of the first custom signal and the second signal (which can be performed in a manner similar to fourth component that is configured to determine a performance metric of a sub-system of the radio unit based on a comparison of the first custom signal and the second signal 714).

After operation 1314, process flow 1300 moves to 1316, where process flow 1300 ends.

Conclusion

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
    a radio unit comprising a digital front end, wherein the digital front end comprises a group of tap points that is configured to receive a first custom signal;
    first hardware configured to originate the first custom signal; and
    second hardware configured to select a first tap point of the group of tap points, and inject the first custom signal into the first tap point, wherein the first tap point is configured to selectively mask a portion of the first custom signal, and wherein the first tap point is configured to align a timing of the first custom signal with a system time of the radio unit.

2. The system of claim 1, further comprising:
    third hardware configured to read a second signal from the radio unit, wherein the second signal is generated based on the first custom signal; and
    fourth hardware configured to determine a performance metric of a sub-system of the radio unit based on a comparison of the first custom signal and the second signal, wherein the first tap point corresponds to the sub-system.

3. The system of claim 1, wherein the first tap point is positioned in a down link path of the radio unit.

4. The system of claim 1, wherein the first tap point is positioned in an up link path of the radio unit.

5. The system of claim 1, wherein the first tap point is positioned in a feedback path of the radio unit.

6. The system of claim 1, wherein the second hardware is configured to inject the first custom signal into the first tap point in a time domain portion of the radio unit.

7. The system of claim 1, further comprising:
    a first antenna branch of the radio unit, and a second antenna branch of the radio unit, wherein the group of tap points comprises at least one tap point that corresponds to the first antenna branch, and at least one tap point that corresponds to the second antenna branch.

8. The system of claim 7, wherein the first tap point corresponds to the first antenna branch, and wherein the second hardware is configured to inject a second custom signal into the second antenna branch.

9. The system of claim 8, wherein the first custom signal differs from the second custom signal, and wherein the second hardware is configured to inject the first custom signal into the first tap point concurrently with injecting the second custom signal into the second antenna branch.

10. The system of claim 1, wherein the first custom signal comprises live-air traffic data that is sourced from a distributed unit of a radio, and wherein the radio comprises the radio unit.

11. A method comprising:
    identifying, by a system comprising at least one hardware processor, a group of tap points in a digital front end of a radio unit, wherein the group of tap points are configured to receive a first custom signal;
    originating, by the system, the first custom signal;
    selecting, by the system, a first tap point from the group of tap points;
    injecting, by the system, the first custom signal into the first tap point to produce an injected first custom signal;
    selectively masking, by the system, a portion of the injected first custom signal to produce a masked first custom signal; and
    time aligning, by the system, the masked first custom signal with a time of the radio unit.

12. The method of claim 11, wherein the first custom signal passes through one digital front end block of the radio unit when injected into the first tap point.

13. The method of claim 11, wherein the first custom signal passes through multiple digital front end blocks of the radio unit when injected into the first tap point.

14. The method of claim 11, wherein the first custom signal passes to an analog portion of a signal chain of the radio unit when injected into the first tap point.

15. An apparatus comprising:
    first circuitry that is configured to originate a first custom signal;
    second circuitry that is configured to select a first tap point of a group of tap points of a digital front end of a radio unit; and
    third circuitry that is configured to inject the first custom signal into the first tap point, wherein the first custom signal comprises live-air traffic data that is sourced from a distributed unit of a radio, and wherein the radio comprises the radio unit.

16. The apparatus of claim 15, wherein the first circuitry that is configured to originate the first custom signal is configured to select the first custom signal from one or more of:
    a memory that stores signal data;
    a generator that is configured to generate first in-phase, quadrature sub-carrier values;
    a look up table that stores predetermined second in-phase, quadrature sub-carrier values; and
    a pseudo-random look up table generator that is configured to operate on the predetermined second in-phase, quadrature sub-carrier values to produce a pseudo-random symbol of data values.

17. The apparatus of claim 15, wherein the first custom signal bypasses a block of the radio unit that is configured to translate frequency domain data into time domain data and insert a cyclic prefix when injected into the first tap point.

18. The apparatus of claim 15, further comprising:
fourth circuitry that is configured to align the first custom signal on a time boundary of the radio unit.

19. The apparatus of claim 15, further comprising:
fourth circuitry that is configured adjust a gain of the first custom signal before the second circuitry injects the first custom signal into the first tap point.

20. The apparatus of claim 15, wherein the first custom signal comprises a combination of live-air traffic data that is sourced from a distributed unit of a radio, and custom data, and wherein the radio comprises the radio unit.

* * * * *